(12) United States Patent
Say et al.

(10) Patent No.: US 11,661,362 B2
(45) Date of Patent: May 30, 2023

(54) POINT-SOURCE WASTEWATER NEUTRALIZATION SYSTEM

(71) Applicant: Zurn Industries, LLC, Milwaukee, WI (US)

(72) Inventors: Christopher J. Say, Waterford, PA (US); Adam F. Wagner, Lakewood, NY (US)

(73) Assignee: Zurn Industries, LLC, Milwaukee, WI (US)

( * ) Notice: Subject to any disclaimer, the term of this patent is extended or adjusted under 35 U.S.C. 154(b) by 306 days.

(21) Appl. No.: 16/748,448

(22) Filed: Jan. 21, 2020

(65) Prior Publication Data
US 2021/0221714 A1 Jul. 22, 2021

(51) Int. Cl.
*C02F 1/66* (2023.01)
*C02F 103/00* (2006.01)

(52) U.S. Cl.
CPC .......... *C02F 1/66* (2013.01); *C02F 2103/002* (2013.01)

(58) Field of Classification Search
CPC ....................................... C02F 1/66
See application file for complete search history.

(56) References Cited

U.S. PATENT DOCUMENTS

| | | | |
|---|---|---|---|
| 4,913,815 A * | 4/1990 | Shulda | B01D 24/08 210/287 |
| 4,949,406 A | 8/1990 | Canelli | |
| 6,153,095 A | 11/2000 | Francisco | |
| 6,387,261 B1 | 5/2002 | Mojena | |
| 6,513,177 B1 | 2/2003 | Beveridge | |
| 7,704,386 B2 | 4/2010 | Ventura | |
| 8,298,417 B2 | 10/2012 | Lemay et al. | |
| 8,382,993 B1 | 2/2013 | Wisek et al. | |
| 9,021,621 B2 | 5/2015 | Booker, Jr. | |
| 9,976,295 B1 | 5/2018 | Booker, Jr. | |
| 10,358,804 B1 | 7/2019 | Schwarz et al. | |
| 2008/0035551 A1 * | 2/2008 | Kuo | B01D 63/084 210/321.72 |
| 2012/0012510 A1 | 1/2012 | Ventura | |
| 2013/0220913 A1 * | 8/2013 | Cohen | B01D 29/68 210/275 |
| 2018/0273398 A1 * | 9/2018 | Pehar | C02F 1/003 |
| 2019/0368184 A1 | 12/2019 | Lo | |

OTHER PUBLICATIONS

Zurn, PHIX Owner's Manual, Acid Neutralization Systems, website: https://www.zurn.com/products/acid-neutralization/phix/z9a-phix dated May 2018 20 pages.

* cited by examiner

*Primary Examiner* — Peter Keyworth
(74) *Attorney, Agent, or Firm* — Michael Best & Friedrich LLP

(57) ABSTRACT

A point-source wastewater neutralization system for collecting and treating wastewater discharged by a point-source. The system includes a container coupled to the drain of the point-source to receive the untreated liquid. The container supports wastewater neutralization media for treating and neutralizing the wastewater. The system also includes an insert assembly to retain the wastewater neutralization media in the container and assist in the exchange of the media.

18 Claims, 25 Drawing Sheets

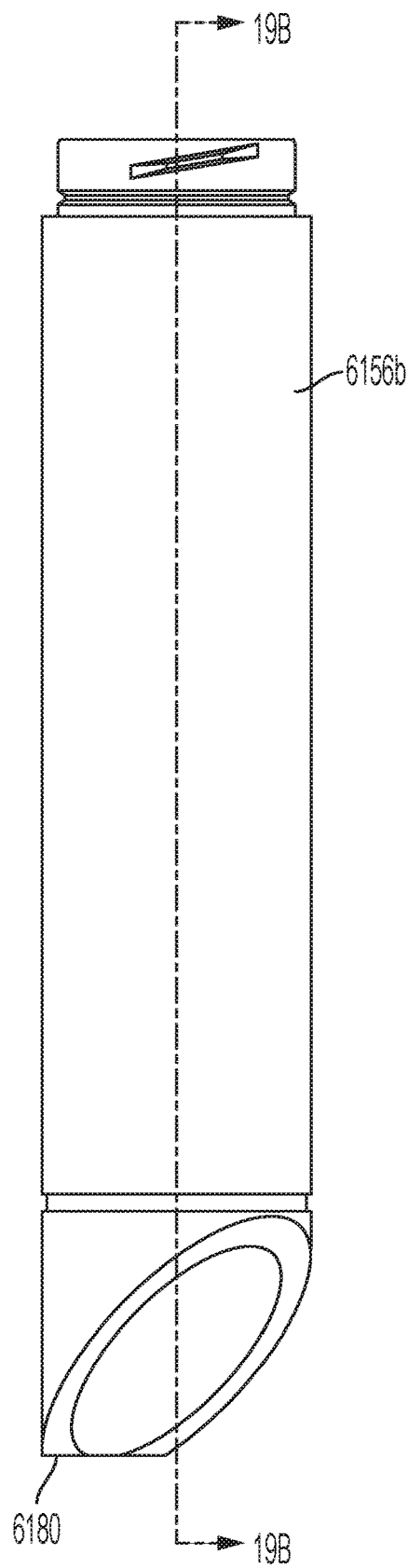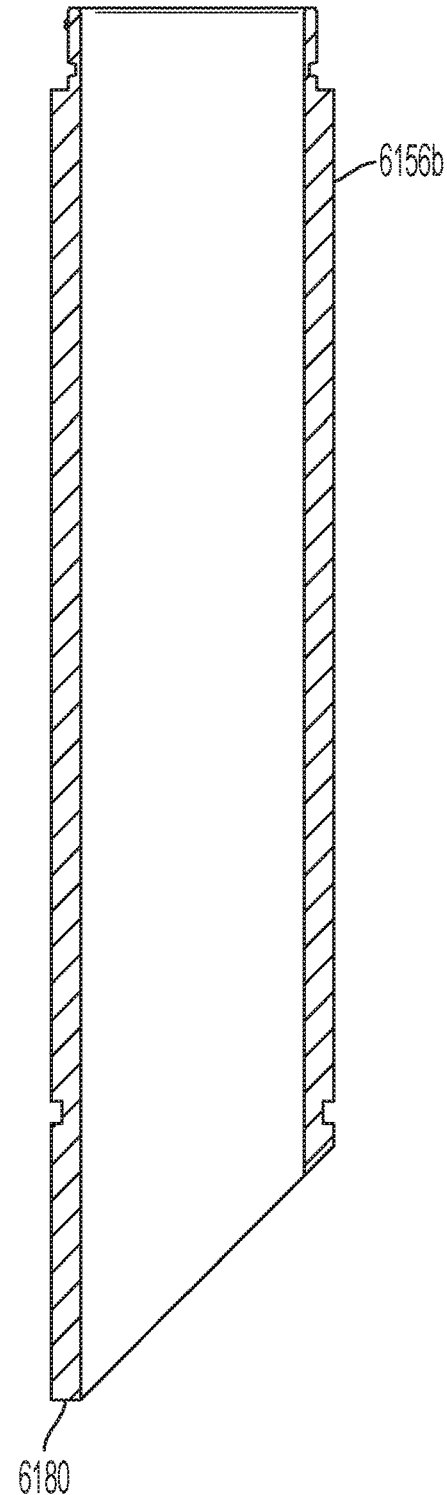
FIG. 19A
FIG. 19B

POINT-SOURCE WASTEWATER NEUTRALIZATION SYSTEM

FIELD

The present disclosure relates to a point-source wastewater neutralization system, and more specifically, a point-source wastewater neutralization system able to efficiently remove and replace the neutralization media positioned therein.

BACKGROUND

Wastewater neutralization systems generally rely on large collection containers in on the building scale to collect and treat liquids discharged by each of the point-sources present therein. By doing so, the water return system must be prepared to handle the untreated liquids as they travel between the point-source and the wastewater neutralization system.

SUMMARY

In one embodiment, the present disclosure provides a wastewater neutralization system for use with a point-source device. The wastewater neutralization system comprises a housing, an interior volume at least partially defined by the housing, wherein the interior volume includes an inlet in fluid communication with the point-source device and an outlet, wastewater neutralization media positioned within the interior volume, and a basket removably located within the interior volume of the body between the inlet and the outlet, wherein the basket includes one or more perforations formed therein that are sized such that a majority of the wastewater neutralization media cannot pass therethrough, and wherein removing the basket from the interior volume causes the basket to collect and remove the wastewater neutralization media from the interior volume.

In another embodiment, the disclosure provides a wastewater neutralization system for use with a point-source device and wastewater neutralization media. The wastewater neutralization system comprises a housing having an interior surface that at least partially defines an interior volume, a basket at least partially positioned within the interior volume and removable therefrom, wherein the basket includes one or more apertures formed therein, and wherein the apertures are sized such that a majority of the wastewater neutralization media cannot pass therethrough, and a flange coupled to the basket and configured to contact the interior surface, wherein the flange is formed from flexible material.

In yet another embodiment, the disclosure provides a wastewater neutralization system for use with a point-source device. The wastewater neutralization system comprises a housing having an interior surface at least partially defining an interior volume therein, wherein the housing has a first open end and an insert at least partially positioned within the interior volume and removable therefrom via the open end. The insert includes a core, a first membrane coupled to the core, wherein the first membrane includes one or more perforations, and a second membrane coupled to the core and spaced a distance from the first membrane, wherein the second membrane includes one or more perforations, and wastewater neutralization media positioned within the volume and located between the first membrane and the second membrane, wherein the wastewater neutralization media is sized such that it cannot pass through the one or more perforations of the first membrane or the one or more perforations of the second membrane.

In yet another embodiment, the disclosure provides a wastewater neutralization system for use with a point-source device and wastewater neutralization media. The wastewater neutralization system comprises a housing having an interior surface at least partially defining an interior volume therein, wherein the housing has a first open end, and wherein the housing includes an inlet and an outlet, and an insert at least partially positioned within the interior volume and removable therefrom via the open end, wherein the insert is positioned downstream of the inlet and upstream of the outlet. The insert includes a membrane, wherein the first membrane includes one or more perforations sized such that the wastewater neutralization media cannot pass therethrough, and a basket fixed spatially relative to the membrane and spaced a distance therefrom, wherein the basket includes one or more perforations formed therein sized such that the wastewater neutralization media cannot pass therethrough.

In a further embodiment, the disclosure provides a wastewater neutralization system for use with a point-source device. The wastewater neutralization system comprises a housing having an interior surface at least partially defining an interior volume therein, an inlet in fluid communication with the point-source device and open to the interior volume, an outlet open to the interior volume, wastewater neutralization media positioned within the interior volume, a basket removably located within the interior volume of the body between the inlet and the outlet, wherein the basket includes one or more perforations formed therein that are sized such that the wastewater neutralization media cannot pass therethrough, and a flange coupled to and extending outwardly from the basket, wherein the flange is configured to engage the interior surface of the housing.

In another embodiment, the disclosure provides a wastewater neutralization system for use with a point-source device. The wastewater neutralization system comprises a first housing portion, wherein the first housing portion includes an inlet and an outlet, a second housing portion removably coupled to the first housing portion to define an interior volume therebetween, a first core portion coupled to the first housing portion and in fluid communication with inlet, a second core portion removably coupled to the first core portion, wherein the first core portion and the second core portion produce a channel when coupled together, a membrane coupled to first core portion, wherein the first membrane includes one or more perforations, and a basket coupled to the second core portion, wherein the basket includes one or more perforations, and wastewater neutralization media positioned within the volume and located between the membrane and the basket, wherein the wastewater neutralization media is sized such that it cannot pass through the one or more perforations of the membrane or the one or more perforations of the basket.

In a further embodiment, the disclosure provides a method of replacing wastewater neutralization media from a wastewater neutralization system having a housing at least partially defining an interior volume therein with an inlet and an outlet, a basket at least partially positioned within the interior volume, wherein the basket defines one or more apertures sized such that the wastewater neutralization media cannot pass therethrough. The method comprises adjusting the housing from a closed configuration, in which the interior volume is not accessible from an exterior of the housing, to an open configuration, in which the interior volume is accessible from the exterior of the housing, removing the basket from the interior volume such that the basket collects and retains any wastewater neutralization media contained within the interior volume, replacing or supplementing the wastewater neutralization media, and returning the basket to the interior volume.

In yet another embodiment, the disclosure provides a wastewater neutralization system for use with a point-source device. The wastewater neutralization system comprises a housing having an interior surface at least partially defining an interior volume therein, wherein the housing has a first open end, and an insert at least partially positioned within the interior volume and removable therefrom via the open end. The insert includes a core, a first membrane coupled to the core, wherein the first membrane includes a first effective particle size, and a second membrane coupled to the core, wherein the second membrane includes a second effective particle size different than the first effective particle size.

Other aspects of the disclosure will become apparent by consideration of the detailed description and accompanying drawings.

BRIEF DESCRIPTION OF THE DRAWINGS

FIGS. 19A-19D illustrate a multi-piece core of the water neutralization system of FIG. 16.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

Figure 1:
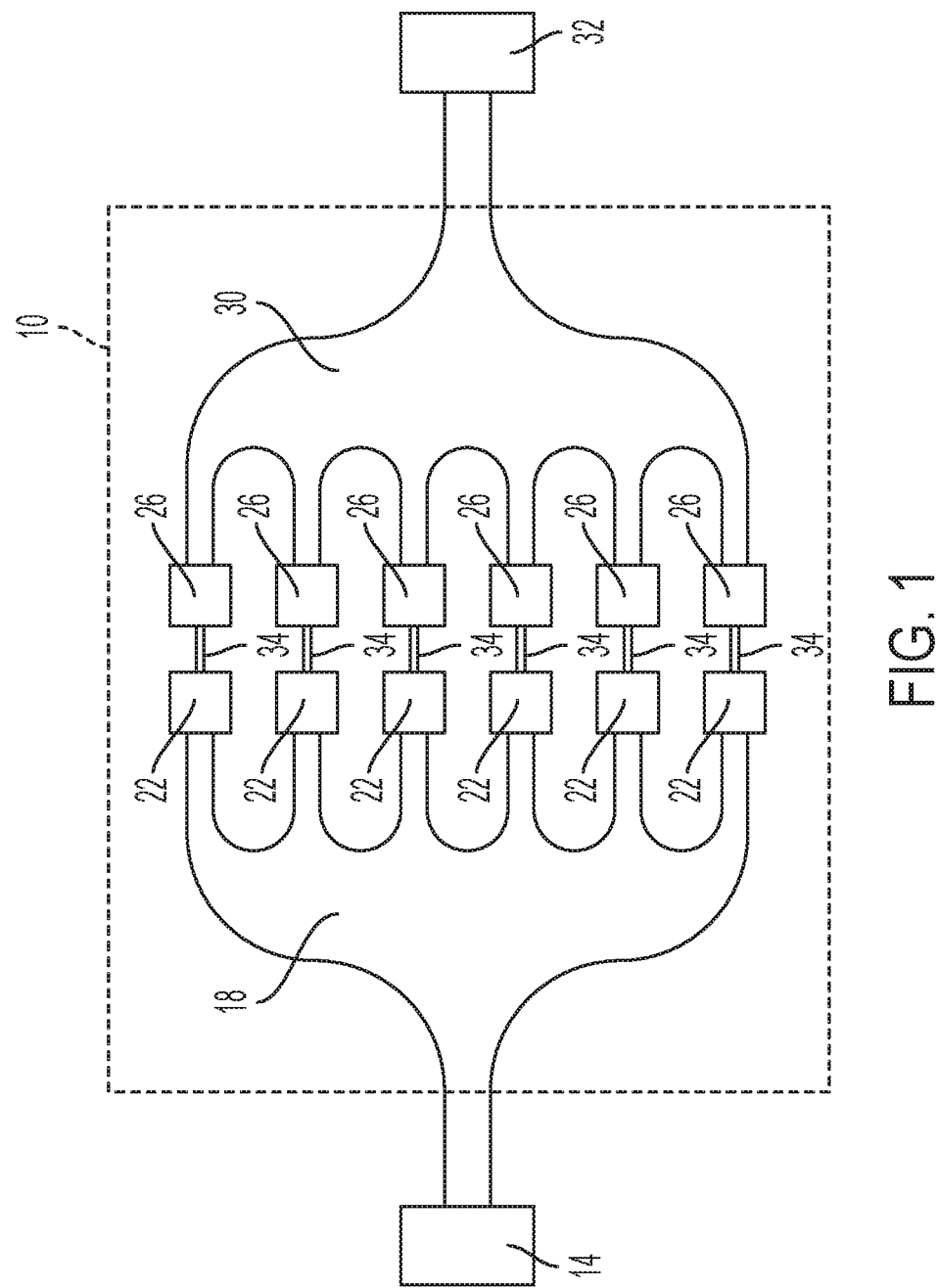
FIG. 1 is a schematic view of a facility water management system.

FIG. 1 illustrates a schematic of a facility water system 10 for use in a home, business, industrial site, and the like. The water system 10 includes a water supply 14 (e.g., a municipal water system, a well, a reservoir, and the like), a water distribution system 18, a plurality of point-sources 22, a plurality of water neutralization systems 26 each associated with a corresponding point-source 22, a water return system 30, and a discharge system 32 (e.g., a municipal sanitary sewer system, a water treatment facility, a septic system, sump, and the like).

Each point-source 22 of the water system 10 generally includes an access point where a user may 1) gain access to or utilize the water being provided from the water distribution system 18 and/or 2) discharge fluids into the water return system 30. In the illustrated implementation, the point-sources 22 include, but are not limited to, a sink, a toilet, a urinal, laboratory stations, a spigot, a shower, and the like. Each point-source 22, in turn, includes a drain 34 where water and/or other fluids may be discharged after use. The illustrated point-sources 22 provide both a source of and drain for water and other fluids. In some implementations, the point-sources 22 may also include a stand-alone discharge location (e.g., the drain 34) such as, but not limited to a floor drain, sump system, and the like.

One or more of the point-sources 22 may include a water neutralization system 26. It is noted that not all point-sources 22 in a facility require or need the water neutralization system 26. As shown in FIGS. 2-5, each water neutralization system 26 is in fluid communication with and configured to treat the fluid discharged from the drain 34 of a corresponding point-source 22. Each water neutralization system 26 includes a housing 42 at least partially defining an interior volume or cavity 46 therein, an insert assembly 50 at least partially positioned within and removable from the interior volume 46 of the housing 42, and wastewater neutralization media 38 positioned within and configured to treat fluid as it flows through the interior volume 46. In one construction, the housing 42 is a drain body of a drain 34 that defines the interior volume 46. In such a construction, the insert assembly 50 is at least partially positioned within and removable from the interior volume 46 defined by the drain body. For example, a drain body may be positioned within a floor or ground surface, and the insert assembly 50 is removably positioned within the drain body and is fully functional as described below.

Figure 2:
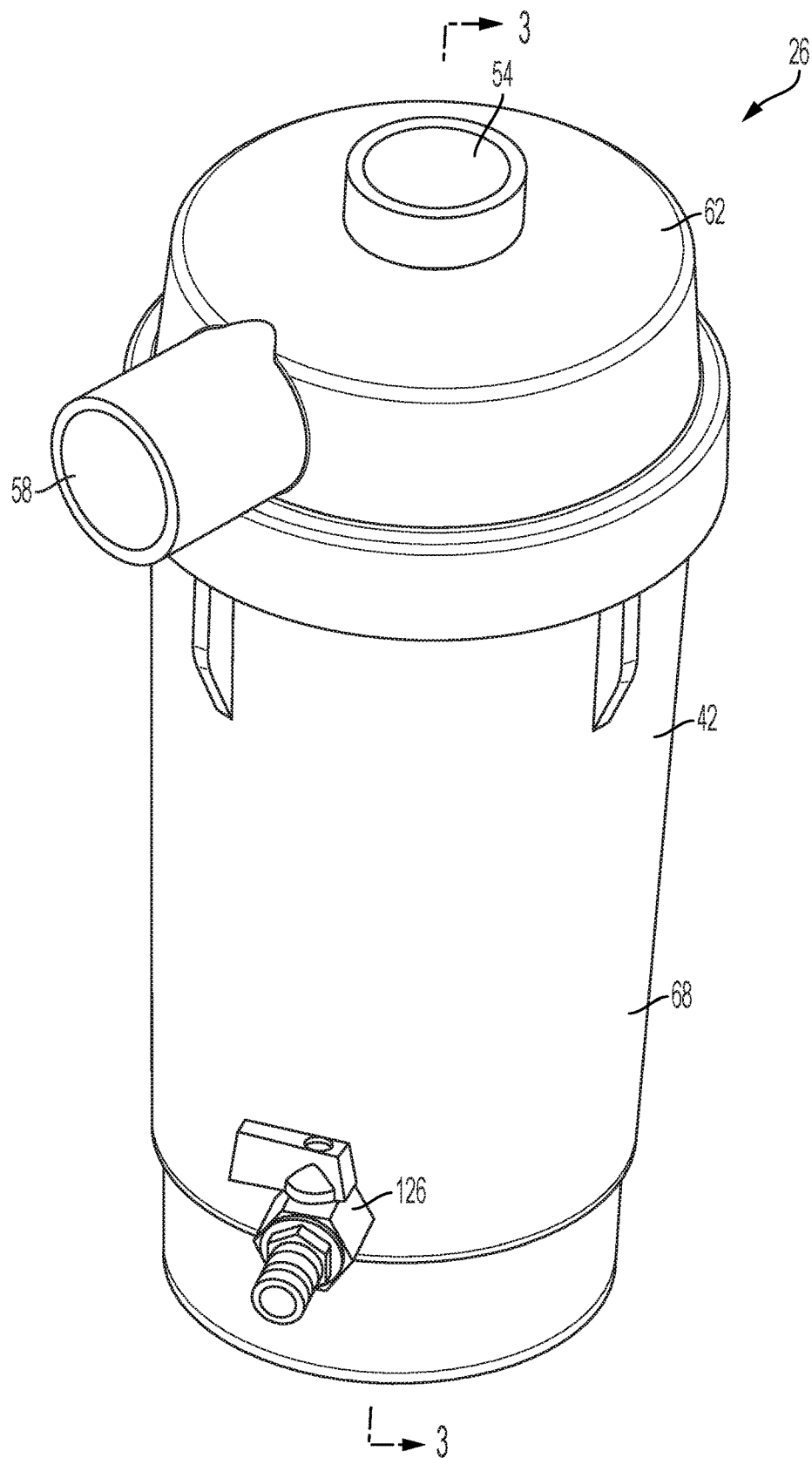
FIG. 2 is a perspective view of a water neutralization system of the facility water management system of FIG. 1.
Figure 3:
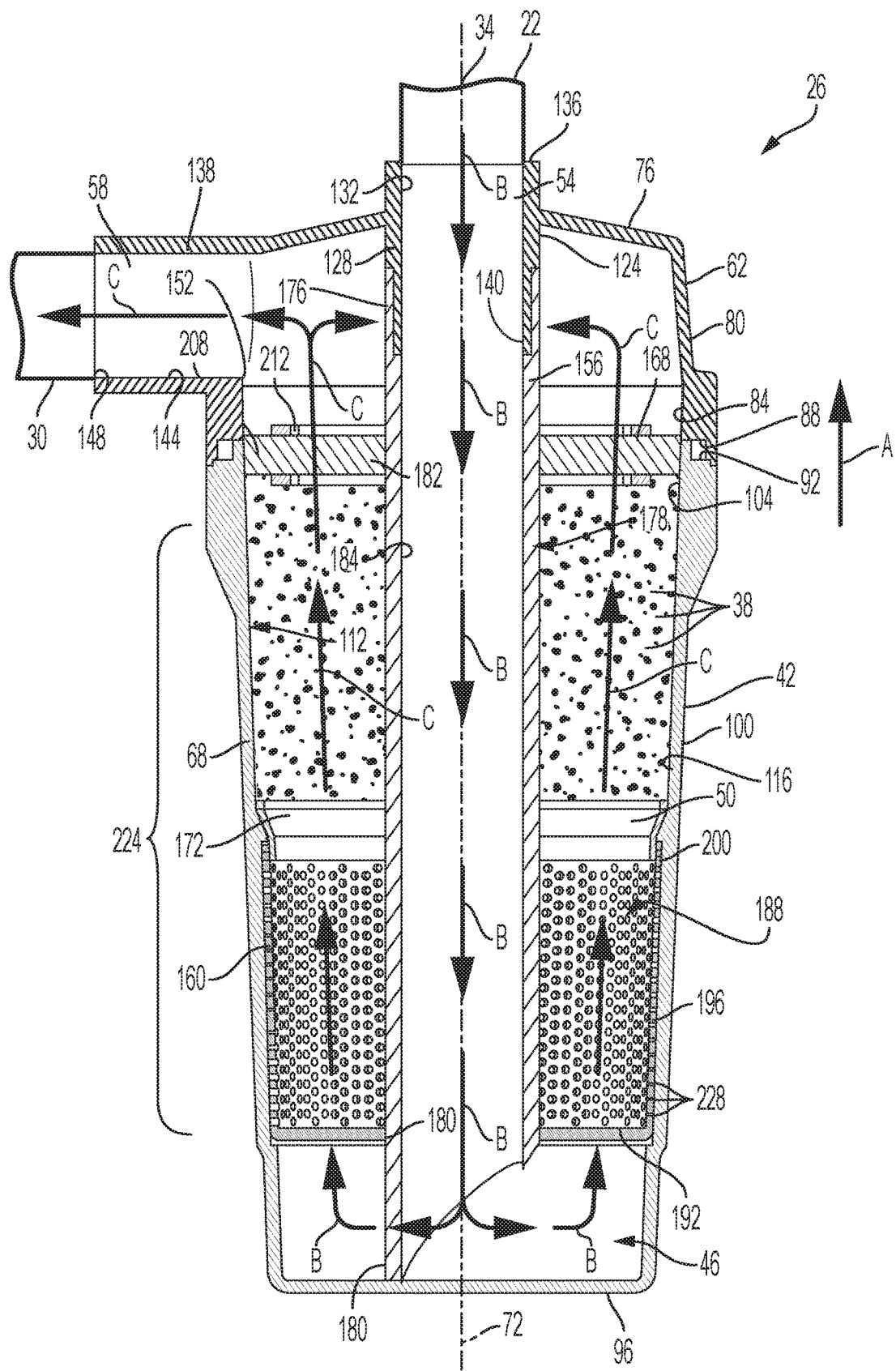
FIG. 3 is a section view taken along 3-3 of FIG. 2.

With continued reference to FIGS. 2-3, the water neutralization system 26 also includes an inlet 54 where untreated fluids are introduced into the interior volume 46, and an outlet 58 where treated fluids exit the interior volume 46. When installed in the water system 10, the inlet 54 of each water neutralization system 26 is coupled to and in fluid communication with the drain 34 of a corresponding point-source 22 while the outlet 58 of each water neutralization system 26 is coupled to and in fluid communication with the water return system 30.

The water neutralization media 38 of the water neutralization system 26 generally includes a collection of individual pellets or granules formed from material configured to chemically interact with and neutralize fluid as it flows by and comes into contact with the media 38 itself. During use, a predetermined amount of water neutralization media 38 (e.g., a predetermined volume or weight of granules) is positioned in the interior volume 46 such that the flow of fluid through the volume 46 (e.g., from the inlet 54 to the outlet 58) causes the flow of fluid to pass between and interact with the neutralization media 38. More specifically, the water neutralization media 38 has a sufficiently low density such that the flow of water through the interior volume 46 causes the media 38 to agitate therein. In the illustrated implementation, the water neutralization media 38 has an effective granule width between approximately 0.03 inches and approximately 0.08 inches. In other implementations, the media has an effective granule width between approximately 0.02 inches and approximately 0.08 inches. In still other implementations, the media 38 may be approximately 52% by weight between approximately 0.03 inches and approximately 0.08 inches. In still other implementations, the media 38 may be approximately 47% by weight between approximately 0.02 inches and approximately 0.03 inches. In still other implementations the media 38 may be approximately 99% by weight between approximately 0.02 inches and approximately 0.08 inches.

While the media 38 of the illustrated embodiment of the water neutralization system 26 is only shown positioned outside the channel 184 of the core 156. It is understood that in alternative embodiments, not shown, the media 38 may also be partially or completely positioned within the channel 184. In such embodiments, the media 38 positioned within the channel 184 may still be considered positioned within the interior volume 46.

The housing 42 of the water neutralization system 26 includes a first housing portion or cap 62, and a second housing portion or base 68 removably coupled to the first housing portion 62 to at least partially define the interior volume 46 therebetween. The housing 42 also defines a longitudinal axis 72 extending therethrough (see FIG. 3). During use, the housing 42 is adjustable between a closed configuration (see FIG. 3), in which the cap 62 is releasably sealingly coupled to the base 68 to completely enclose the interior volume 46, and an open or detached configuration (see FIG. 4 with cap 62 removed), in which the base 68 is detached from the cap 62 so that the interior volume 46 is open and accessible via the second open end 104 (described below).

The first housing portion 62 includes a substantially cylindrical body having an end wall 76, and a side wall 80 extending axially from the end wall 76 to define a first open end 84. While the illustrated first housing portion 62 is substantially cylindrical in shape, it is understood that in alternative implementations, other sizes and shapes of the first housing portion may be used. Furthermore, while the illustrated housing includes an end wall 76 and side wall 80, a single continuous and concave wall (e.g., a hemispherical wall, and the like, not shown) or a first housing portion 62 having many wall segments (not shown) may also be used. The end wall 76 and the side wall 80 may be integrally formed in one piece of material.

Figure 4:
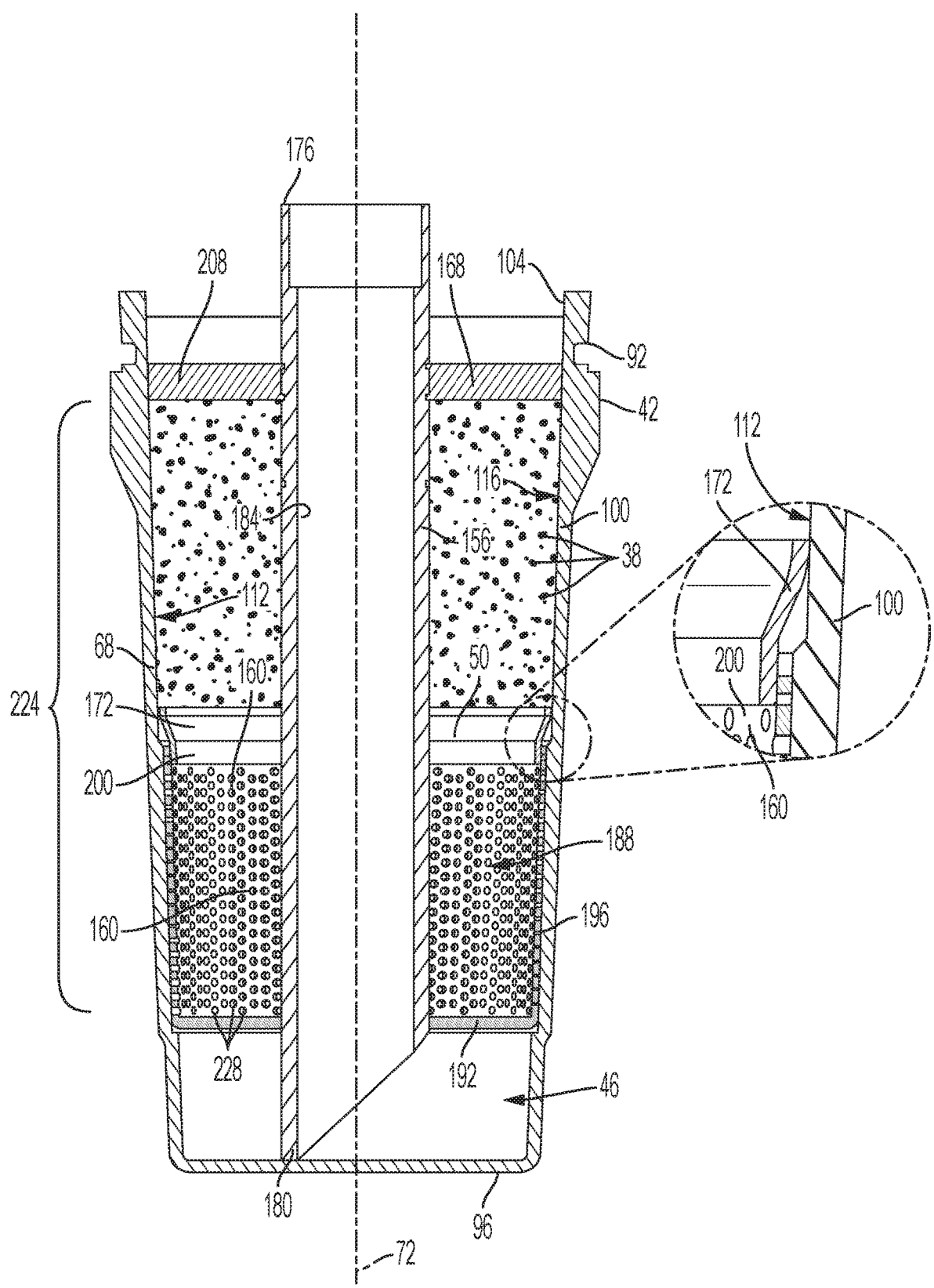
FIG. 4 is a section view of FIG. 3 with a first housing portion removed.
Figure 5:
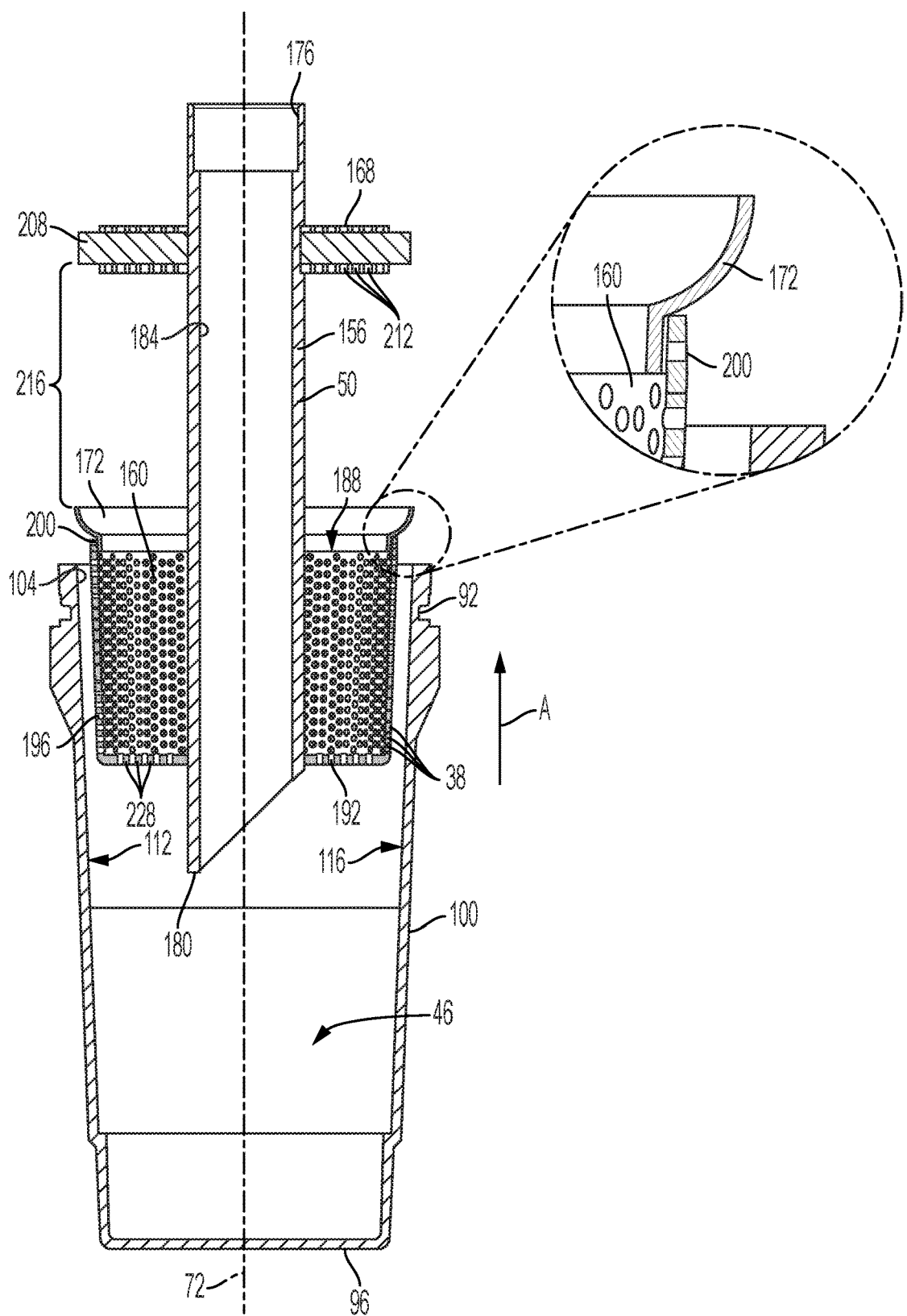
FIG. 5 is a section view of FIG. 4 with an insert removed from an interior volume.

As shown in FIGS. 3-5, the first open end 84 of the first housing portion 62 includes a first locking interface 88 configured to releasably engage and selectively form a water-tight seal with a corresponding second locking interface 92 of the second housing portion 68 (described below). In the illustrated implementation, the first locking interface 88 includes a set of threads (not shown). However, in alternative implementations, different forms of engagement and sealing may be used such as, but not limited to, locking teeth, pawls, grooves, sealing surfaces, o-rings, separate clasps, and the like.

The second housing portion 68 of the housing 42 includes a substantially cylindrical body having an end wall 96, and a side wall 100 extending from the end wall 96 to define a second open end 104. While the illustrated second housing portion 68 is substantially cylindrical in shape, it is understood that in alternative implementations, other sizes and shapes may be used. Furthermore, while the illustrated implementation includes an end wall 96 and side wall 100, a single continuous and concave wall (e.g., a hemispherical wall, and the like, not shown) or a second housing portion 68 having many wall segments (not shown) may also be used.

In the illustrated implementation, the second open end 104 of the second housing portion 68 includes a second locking interface 92 configured to releasably engage and selectively form a water-tight seal with the corresponding first locking interface 88 of the first housing portion 62. In the illustrated implementation, the second locking interface 92 includes a set of threads (not shown) configured to threadingly engage the threads of the first locking interface 88. However, in alternative implementations, different forms of engagement and sealing may be used such as, but not limited to, locking teeth, pawls, grooves, sealing surfaces, o-rings, separate clasps, and the like.

The second housing portion 68 also includes an interior surface 112 formed by the side wall 100 and at least partially defining the interior volume 46. In the illustrated implementation, the interior surface 112 is substantially circular in cross-sectional shape taken perpendicular to the axis 72 and decreasing in diameter as it extends from the second open end 104 toward the end wall 96. While the illustrated cross-sectional shape is circular, it is to be understood that in alternative implementations, different cross-sectional shapes such as, but not limited to, elliptical, polygonal, and the like may be used. Furthermore, the illustrated interior surface 112 includes a smooth and continuous portion 116 extending axially from the second open end 104 toward the end wall 96 of the second housing portion 68.

The housing 42 also includes a first channel 124 formed therein and providing fluid access to the interior volume 46. The first channel 124 includes a substantially elongated body 128 passing through the body of one of the first housing portion 62 and the second housing portion 68 with a fluid passageway 132 extending therethrough (see FIGS. 2 and 3). The first channel 124 includes a first end 136 and a second end 140 opposite the first end 136. In the illustrated implementation, the first channel 124 passes through the end wall 76 of the first housing portion 62 with the first end 136 positioned outside the interior volume 46, and the second end 140 positioned inside the interior volume 46. The illustrated first channel 124 is also oriented substantially parallel to and co-axial with the longitudinal axis 72 and formed integrally with the first housing portion 62. When the housing 42 is installed in the water system 10, the first channel 124 serves as the inlet 54 of the water neutralization system 26.

The housing 42 also includes a second channel 138 formed therein and providing fluid access to the interior volume 46. The second channel 138 includes a substantially elongated body passing through one of the first housing portion 62 and the second housing portion 68 with a fluid passageway 144 extending therethrough (see FIGS. 2 and 3). The second channel 138 includes a first end 148, and a second end 152 opposite the first end 148. In the illustrated implementation, the second channel 138 passes through the side wall 80 of the first housing portion 62 with the first end 148 positioned outside the interior volume 46 and the second end 152 coincident with the side wall 80 itself. The illustrated second channel 138 is also oriented substantially perpendicular to the longitudinal axis 72 and formed integrally with the first housing portion 62. When the housing 42 is installed in the water system 10, the second channel 138 serves as the outlet 58 of the water neutralization system 26.

By incorporating both the first channel 124 (e.g., inlet 54) and the second channel 138 (e.g., the outlet 58) into the first housing portion 62, all exterior plumbing connections are associated with the first housing portion 62. As such, the second housing portion 68 is free from exterior plumbing connections and therefore can be removed and independently handled during maintenance operations without the need to detach the second housing portion 68 from any plumbing fittings.

While both the first channel 124 and the second channel 138 of the illustrated implementation are formed into the first housing portion 62, it is to be understood that in alternative implementations, either channel 124, 138 may be re-positioned or oriented relative to one another or formed into the second housing portion 68. For example, in some implementations, the first channel 124 may be formed into the end wall 96 of the second housing portion 68 (not shown).

The housing 42 also includes a drain valve 126 in fluid communication with the interior volume 46 and configured to allow the user to drain the fluid therefrom (see FIG. 2). More specifically, the drain valve 126 is located at a vertically bottom location of the housing 42 (e.g., proximate the end wall 96 of the second housing portion 68 when the axis 72 is in a substantially vertical orientation) such that placing the valve 126 in the open configuration allows any fluids contained in the interior volume 46 to be drained therefrom. This minimizes spillage when removing the second housing portion 68 from the first housing portion 62 by allowing the user to remove the fluid ahead of time. While the illustrated housing 42 includes a drain valve 126, in alternative implementations, no valve 126 may be present.

With reference to FIG. 3, the insert assembly 50 of the water neutralization system 26 includes a core 156, a basket 160 coupled to the core 156, a first membrane 168 coupled to the core 156, and a flange or squeegee 172. During use, the insert assembly 50 is at least partially positioned within the interior volume 46 and removable therefrom. More specifically, the insert 50 is positioned within the portion of the interior volume 46 defined by the second housing portion 68 and may be removed, as a single unit, axially therefrom via the second open end 104 when the housing 42 is in the open configuration.

The core 156 of the insert 50 is substantially elongated in shape and includes a first end 176, and a second end 180 opposite the first end 176. The core 156 also includes an outer surface 178 and may include a first shallow channel 180 nearer the second end 180 to receive and support the basket 160 at a desired location, and a second shallow channel 182 nearer the first end 176 to receive and support the first membrane 168 at a desired location. The shallow channels 180, 182 may extend circumferentially about the core 156.

The core 156, also defines a feed channel 184 extending therethrough and open to both the first end 176 and the second end 180 (see FIG. 3). When the water neutralization system 26 is assembled, the core 156 is oriented within the interior volume 46 co-axially with the longitudinal axis 72 such that the first end 176 of the core 156 is sealingly coupled to the second end 140 of the first channel 124 and the second end 180 of the core 156 is positioned proximate the end wall 96 of the second housing portion 68. Accordingly, the feed channel 184 of the core 156 serves as an extension of the first channel 124 (e.g., the inlet 54) such that fluids flowing through the first channel 124 are discharged into the interior volume 46 proximate the end wall 96 of the second housing portion 68. Stated differently, the inlet 54 is open to and discharges fluids into the interior volume 46 proximate the end wall 96 of the second housing portion 68.

The basket 160 of the insert 50 is at least partially positioned within the interior volume 46. The basket 160 is substantially concave in shape and at least partially defines a storage volume 188 therein. The basket 160 is configured so that removing the basket 160 from the interior volume 46 (e.g., via the second open end 104) causes the basket 160 to collect the neutralization media 38 contained within the interior volume 46, retain the neutralization media 38 within the storage volume 188 of the basket 160, and remove the neutralization media 38 from the interior volume 46 together with the basket 160 itself. In the illustrated implementation, the basket 160 is coupled to the core 156 proximate the second end 180 thereof such that the core 156 and basket 160 move together as a unit.

In the illustrated implementation, the basket 160 of the water neutralization system 26 includes a base wall 192, and a side wall 196 extending from the base wall 192 to produce a distal end 200 relative to the base wall 192. Together, the base wall 192 and side wall 196 provide an overall concave shape facing toward the second open end 104 (e.g., facing downstream) and at least partially defining the storage volume 188. The cross-sectional shape of the distal end 200 (e.g., taken perpendicular to the axis 72) substantially corresponds with but is slightly smaller than the cross-sectional shape of the interior wall 112 (e.g., both are substantially circular in shape). As such, the distal end 200 of the basket 160 is positioned near and travels axially along the interior surface 112 of the interior volume 46 as the basket 160 is removed from the second open end 104.

The basket 160 also includes one or more perforations 228 formed therein to form a second membrane downstream of the inlet 54 and upstream of the outlet 58. More specifically, the perforations 228 of the basket 160 are sized so that most of the water neutralization media 38 cannot pass therethrough but fluid can. As such, at least a portion of the fluid flow between the inlet 54 and the outlet 58 passes through the perforations 228 of the basket 160 during use. Accordingly, removal of the basket 160 from the interior volume 46 removes and collects the neutralization media 38 as described above while still permitting any fluid contained within the interior volume 46 to remain. In the illustrated implementation, the perforations 228 of the second membrane are approximately 0.12 inches in diameter and spaced approximately 0.20 inches apart.

Figure 20:
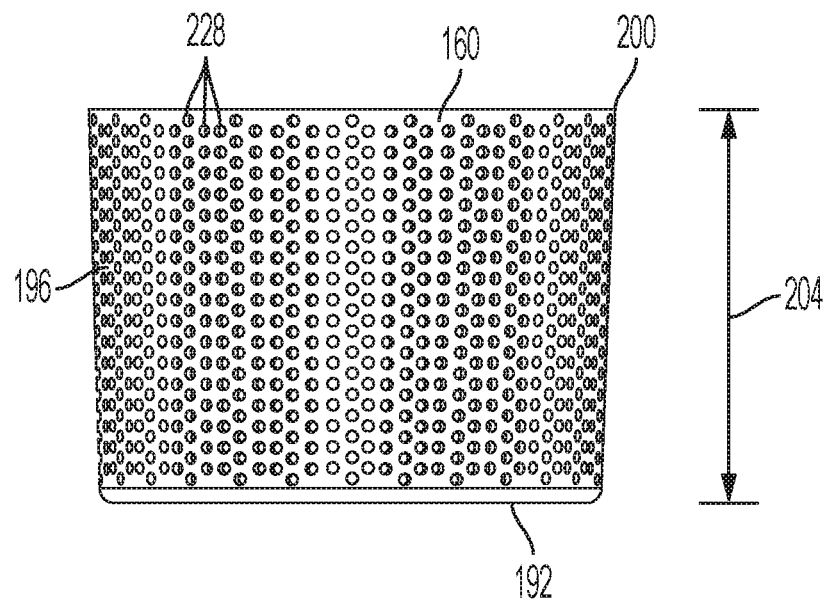
FIGS. 20-23B illustrate various embodiments of a basket used with the water neutralization system.

As shown in FIG. 20, the illustrated basket 160 includes perforations 228 on both the base wall 192 and the side wall 196. However, in alternative implementations, the perforations 228 may only be located on one of the base wall 192 or the side wall 196 (see FIGS. 20-23B). In some configurations, the perforations 228 are substantially the same size. In still other implementations, the perforations 228 may have different sizes (see FIGS. 20-23B). For example, the size of the perforations 228 on the side wall 196 may be smaller than the perforations 228 on the base wall 192. As another example, the perforations 228 may be all the same shape or different shapes (e.g., oval, circle, square, triangular, polygonal, etc.). For example, the shape of the perforations 228 on the side wall 196 may the oval while the shape of the perforations on the base wall 192 may be circular.

While the illustrated basket 160 is substantially cylindrical in shape with the base wall 192 being oriented substantially perpendicular to the side wall 196, in alternative implementations, different sizes and shapes of basket 160 may be used. For example, in some implementations the basket 160 may narrow in cross-sectional shape (e.g., angle radially inwardly and away from the interior surface 112 of the interior volume 46) as it extends from the distal end 200 toward the base wall 192. Such an orientation increases the surface area of the basket 160 through which fluid can flow during use (e.g., the flow surface area of the basket 160 is greater than the cross-sectional surface area of the interior volume 46). In still other implementations, the axial height 204 of the side wall 196 (e.g., defined as the axial distance between the base wall 192 and the distal end 200; see FIG. 20) may be varied to increase or decrease the size of the resulting storage volume 188 (compare FIG. 20 with FIGS. 23A and 23B). Furthermore, while the illustrated basket 160 has a base wall 192 and side wall 196, it is understood that in alternative implementations a single continuous wall or multiple walls may be used.

Figure 21:
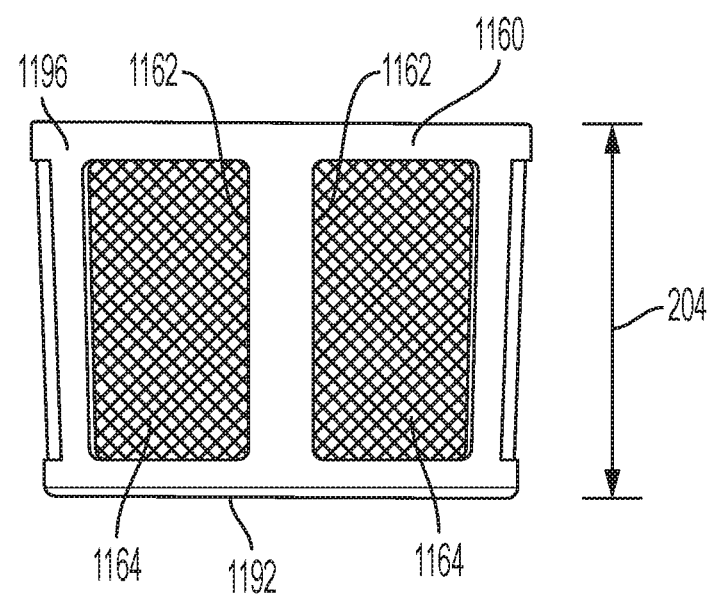
Figure 22A:
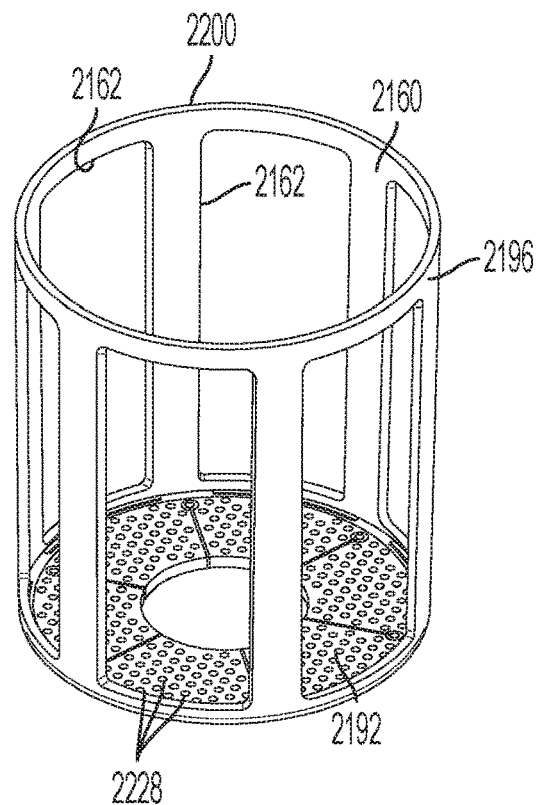
Figure 22B:
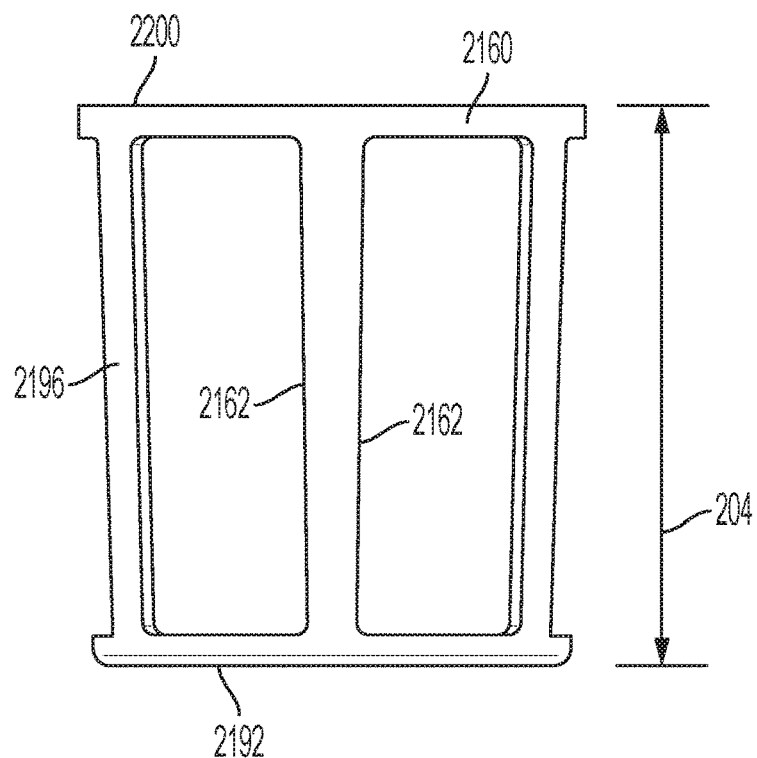
Figure 23A:
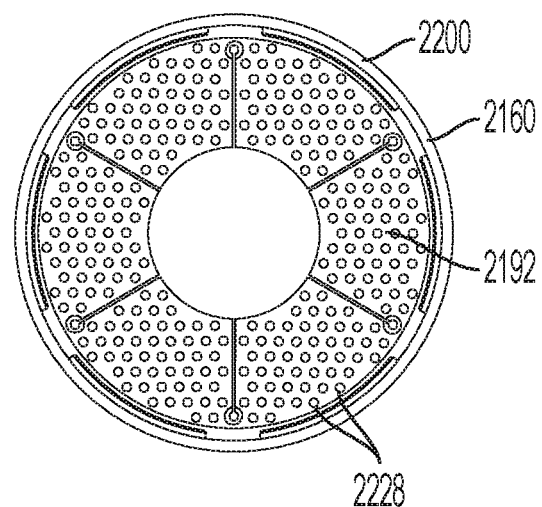
Figure 23B:
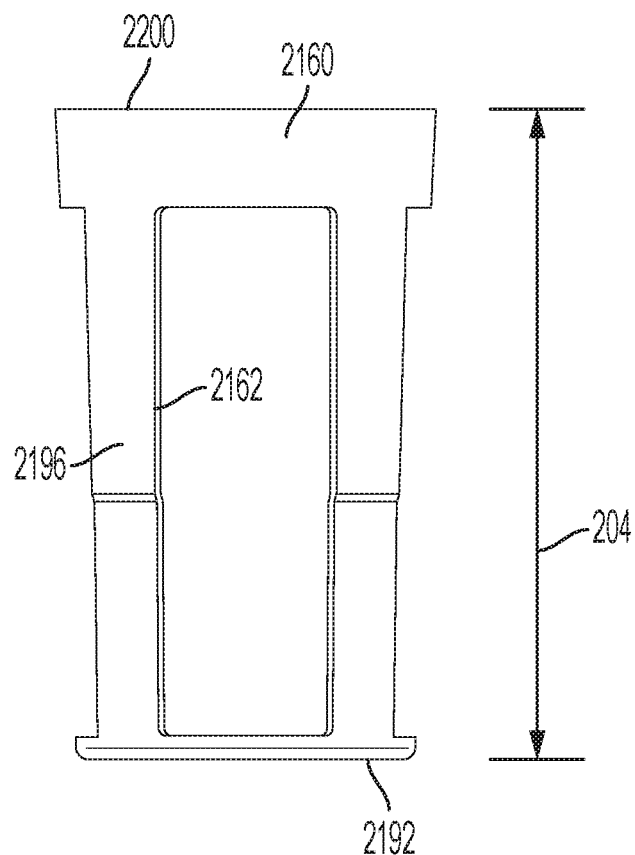
Figure 24:
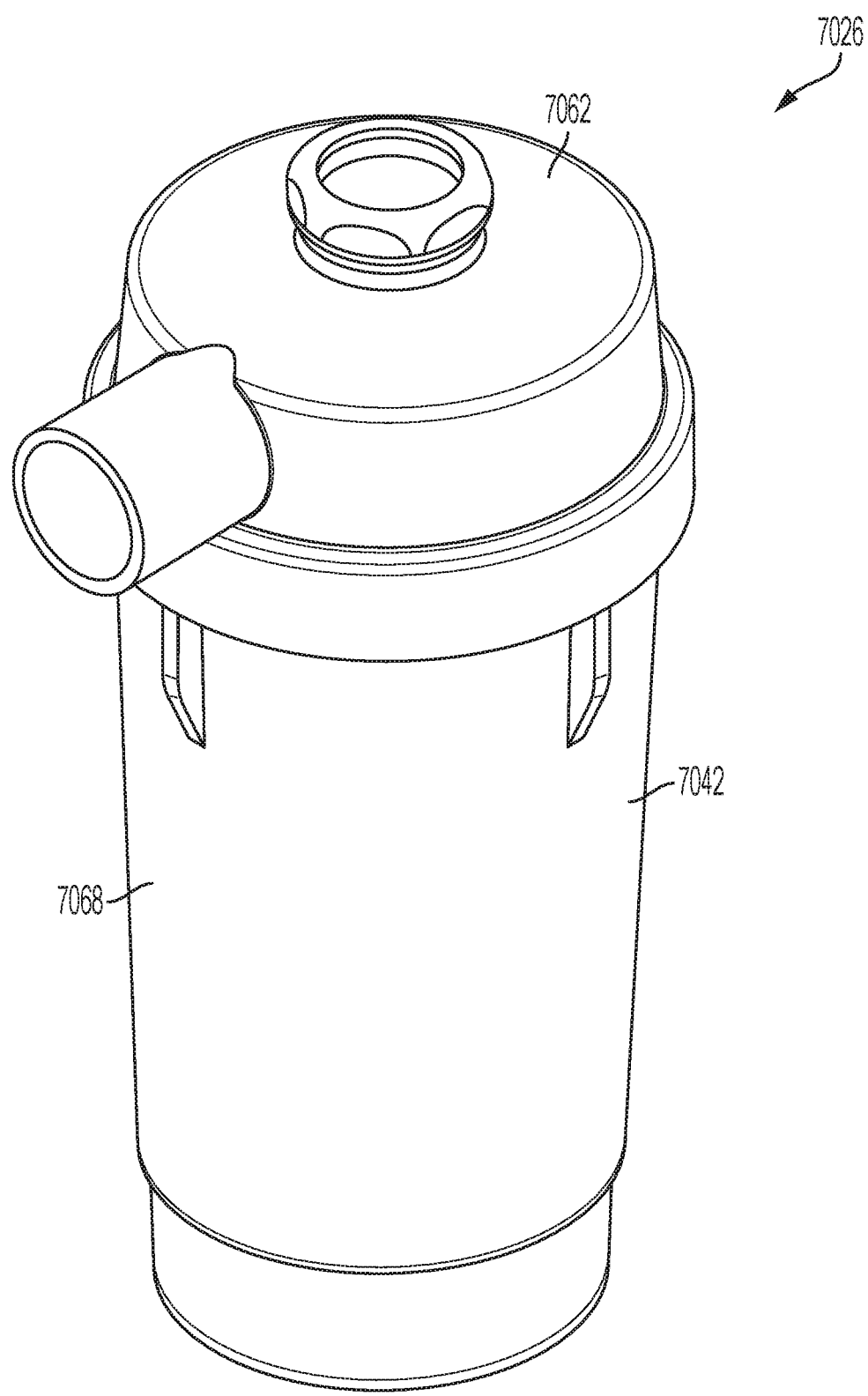
FIGS. 24-28B illustrate another embodiment of a water neutralization system.
Figure 25:
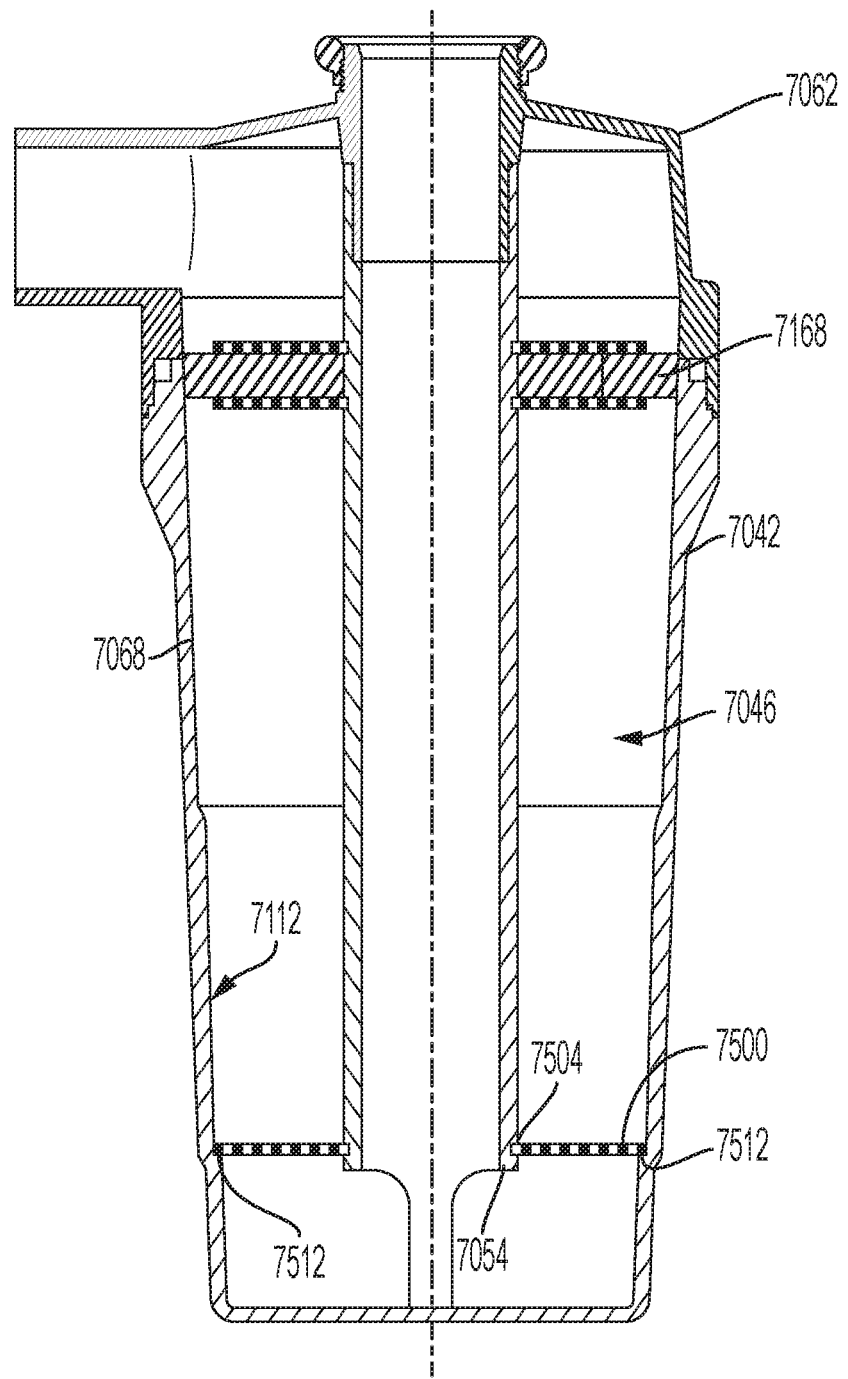
Figure 26:
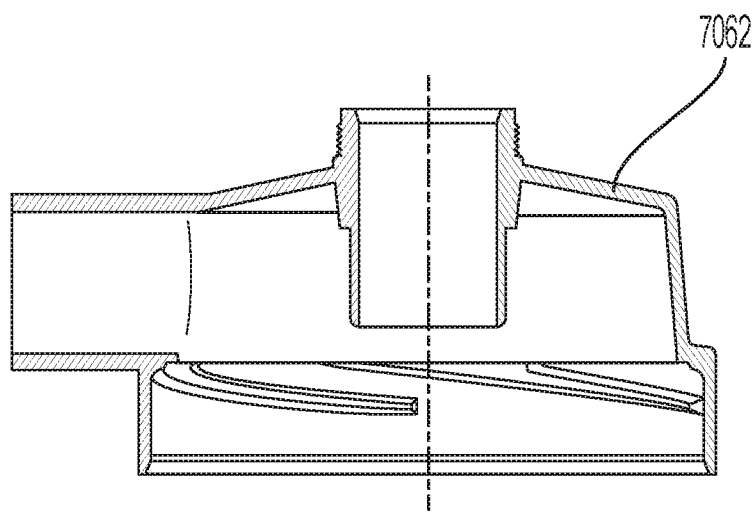
Figure 27:
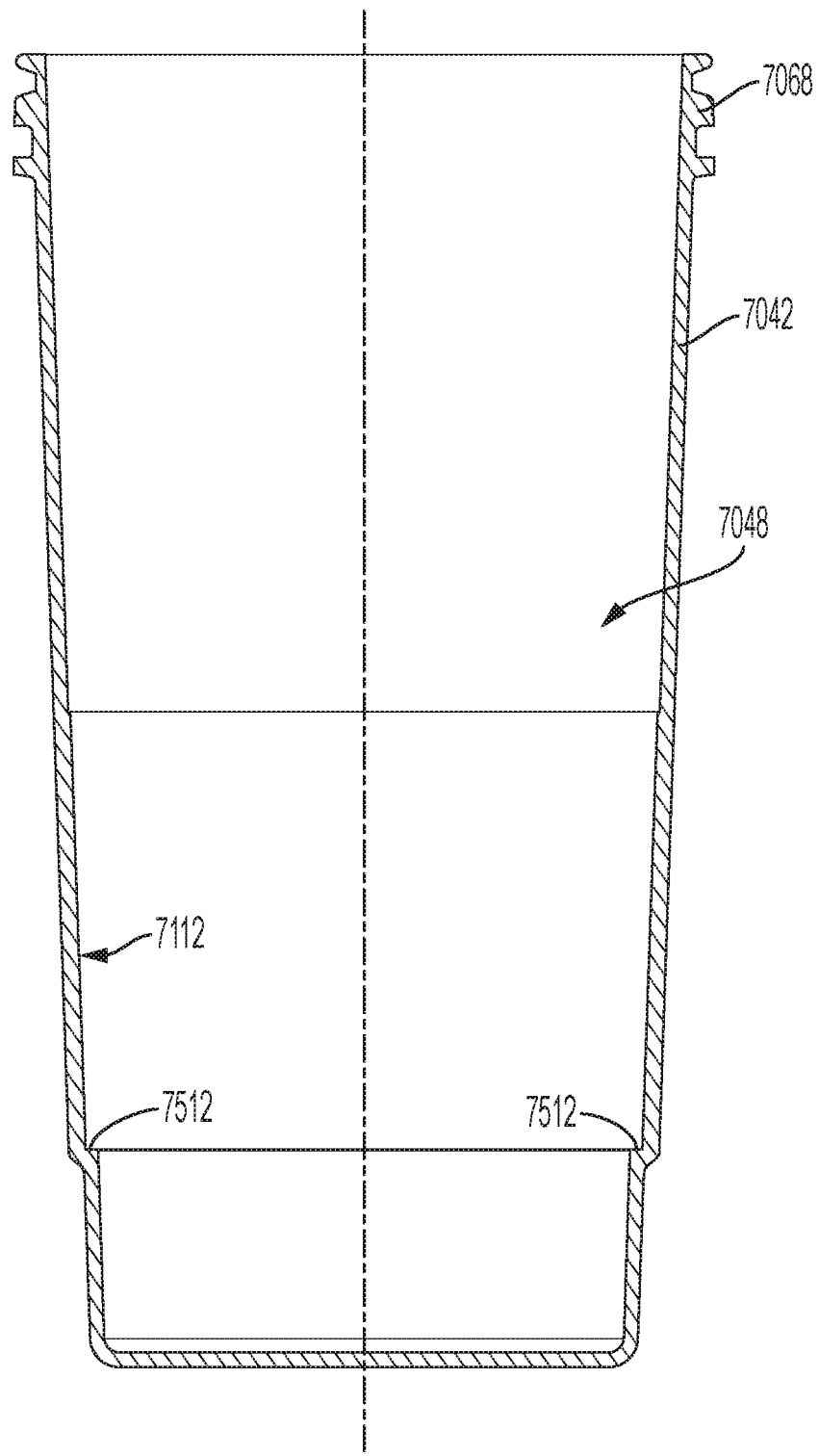
Figure 28A:
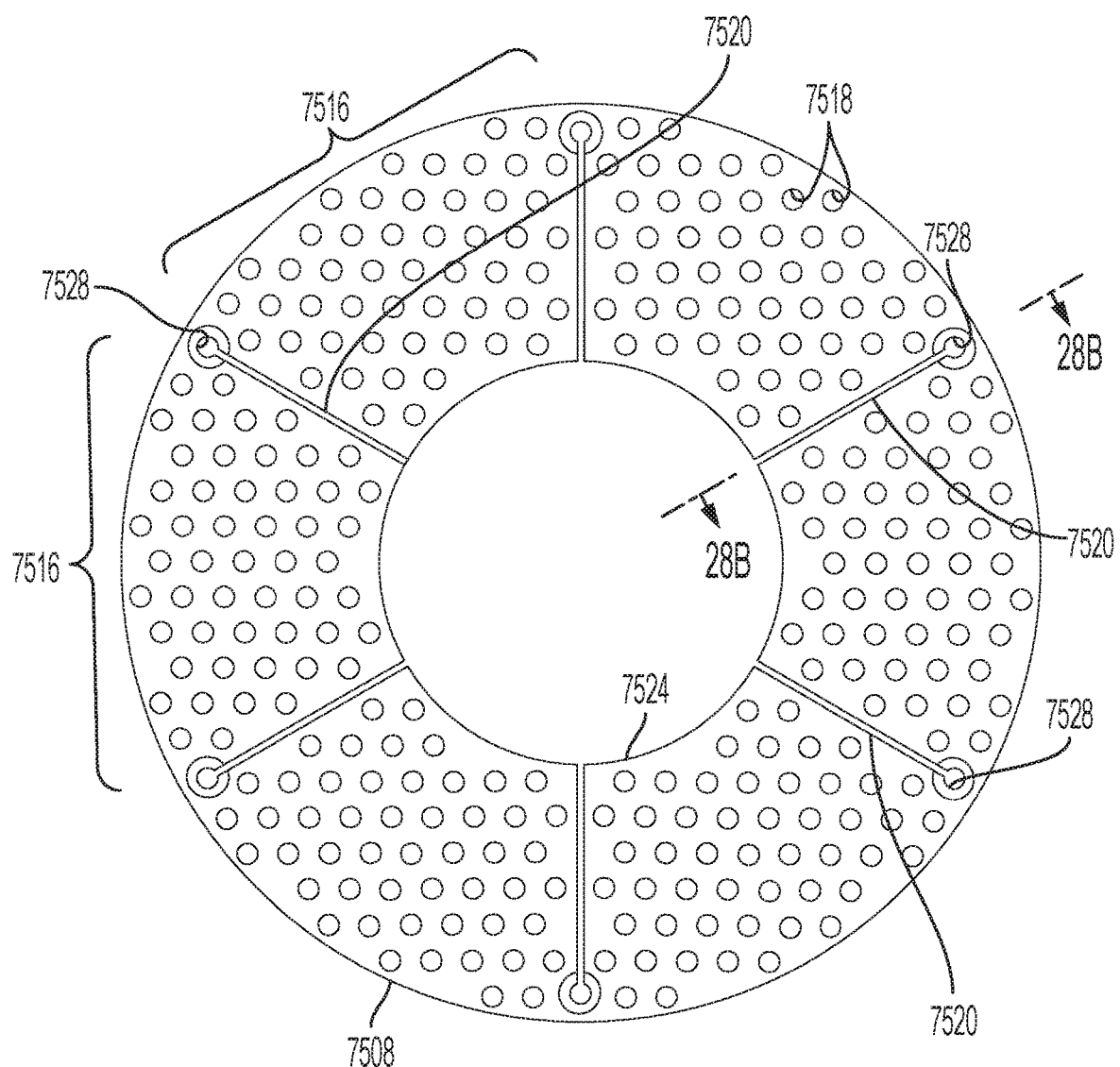
Figure 28B:

For example, with reference to FIG. 21, in one implementation of the basket 1160, the side wall 1196 forms a series of large openings 1162 covered by a mesh or screen material 1164. Although not shown, the large openings 2162 may also be enclosed by separate mesh or screen (see FIGS. 22A and 22B). In still another implementation, of the large openings 2162 may not be covered by mesh or screen material and, instead, remain open.

As shown in FIG. 3, the first membrane 168 of the water neutralization system 26 is at least partially positioned within the interior volume 46 and located upstream of the outlet 58 and downstream of the basket 160 such that at least a portion of the liquid flowing between the inlet 54 and outlet 58 must flow therethrough. The first membrane 168 has a different effective particle size than the second membrane of the basket 160. More specifically, the first membrane 168 is a "finer" filter than the second membrane having a smaller effective particle size. In the illustrated implementation, the first membrane 168 is formed from air filter material.

In the illustrated implementation, the first membrane 168 includes a disk-like body 208 coupled to the core 156 proximate the first end 176 thereof so that the first membrane 168, core 156, and basket 160 all move together as a unit. The disk-like body 208, in turn, engages the interior surface 112 of the interior volume 46 when the insert 50 is positioned therein and covers the cross-sectional width of the interior volume 46. As such, all fluid flowing between the inlet 54 and the outlet 58 must flow therethrough. As shown in FIGS. 3 and 5, the first membrane 168 is positioned axially on the core 156 such that, when the insert 50 is positioned within the interior volume 46, the disk-like body 208 engages the interior surface 112 of the second housing portion 68. The core 156 may include a second shallow channel 182 nearer the first end 176 to receive and support the first membrane 168 at a desired location. The second shallow channel 182 may extend circumferentially about the core 156. The illustrated membrane 168 is also spaced an axial distance 210 from the distal end 200 of the basket 160 to form a gap 216 therebetween.

As shown in FIGS. 3 and 4, when the insert 50 is positioned within the interior volume 46, the basket 160 and first membrane 168 completely enclose a portion of the interior volume 46 therein referred to as the "media region 224." The media region 224 is generally delineated upstream by the basket 160, downstream by the first membrane 168, and externally by the interior surface 112 of the second housing portion 68 (see FIG. 3). During use, the neutralization media 38 is positioned and retained within the media region 224 by the basket 160 and membrane 168 so that the media 38 cannot be carried away by the flow of fluid through the interior volume 46. This form of retention (e.g., both upstream and downstream, and both vertically above and below) is advantageous given the low density of the media granules 38 which agitate and move within the media region 224 toward the outlet 58 when water if flowing therethrough.

In alternative embodiments, not shown, the media region 224 may also extend at least partially into the channel 184 of the core 156. In such embodiments, the media region 224 may be delineated upstream by a membrane positioned within the channel 184 (not shown), and downstream by the first membrane 168. In still other alternative embodiments, the media region 224 may be positioned entirely within the channel 184 of the core 156. In such embodiments, the media region 224 may be delineated both upstream and downstream by membranes positioned within the channel 184 (not shown).

The flange 172 of the insert 50 extends radially therefrom and is configured to engage and move axially along the interior surface 112 to collect and direct stray granules of the water neutralization media 38 into the storage volume 188. More specifically, the flange 172 extends radially outwardly from the distal end 200 of the basket 160 to form a distal end 174 in selective engagement with the interior surface 112. The flange 172 is sized and shaped such that, as the basket 160 is moved axially in the first direction A through the interior volume 46 (e.g., toward the second open end 104), the distal end 174 of the flange 172 slides along the interior surface 112 and directs granules of media 38 attached thereto into the storage volume 188. The flange 172 is formed from flexible material (e.g., rubber) so that the flange 172 is able to flex and compensate for changes in the size and shape of the interior surface 112 relative to the distal end 200 of the basket 160.

Figure 6:
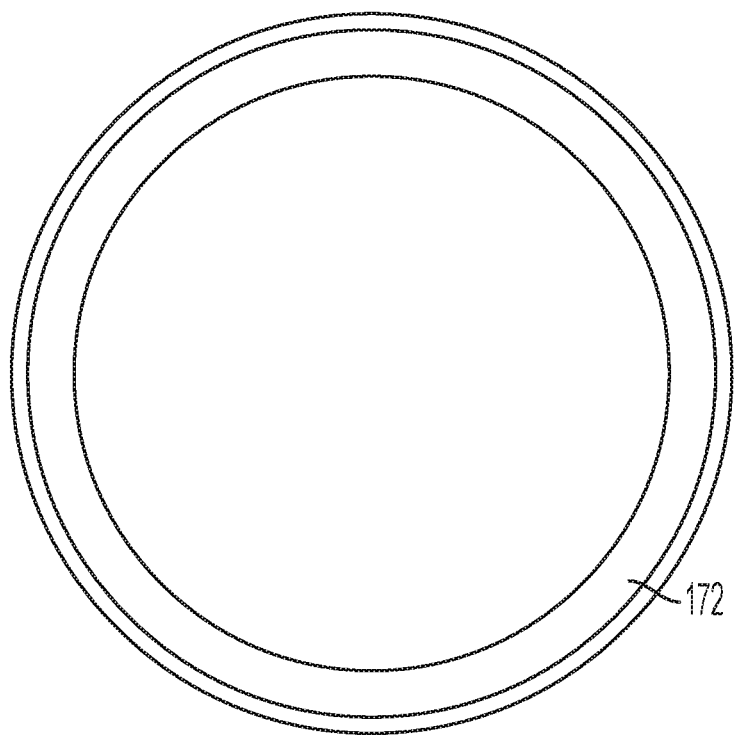
FIG. 6 is an end view of a flange of the water neutralization system of FIG. 3.
Figure 7:
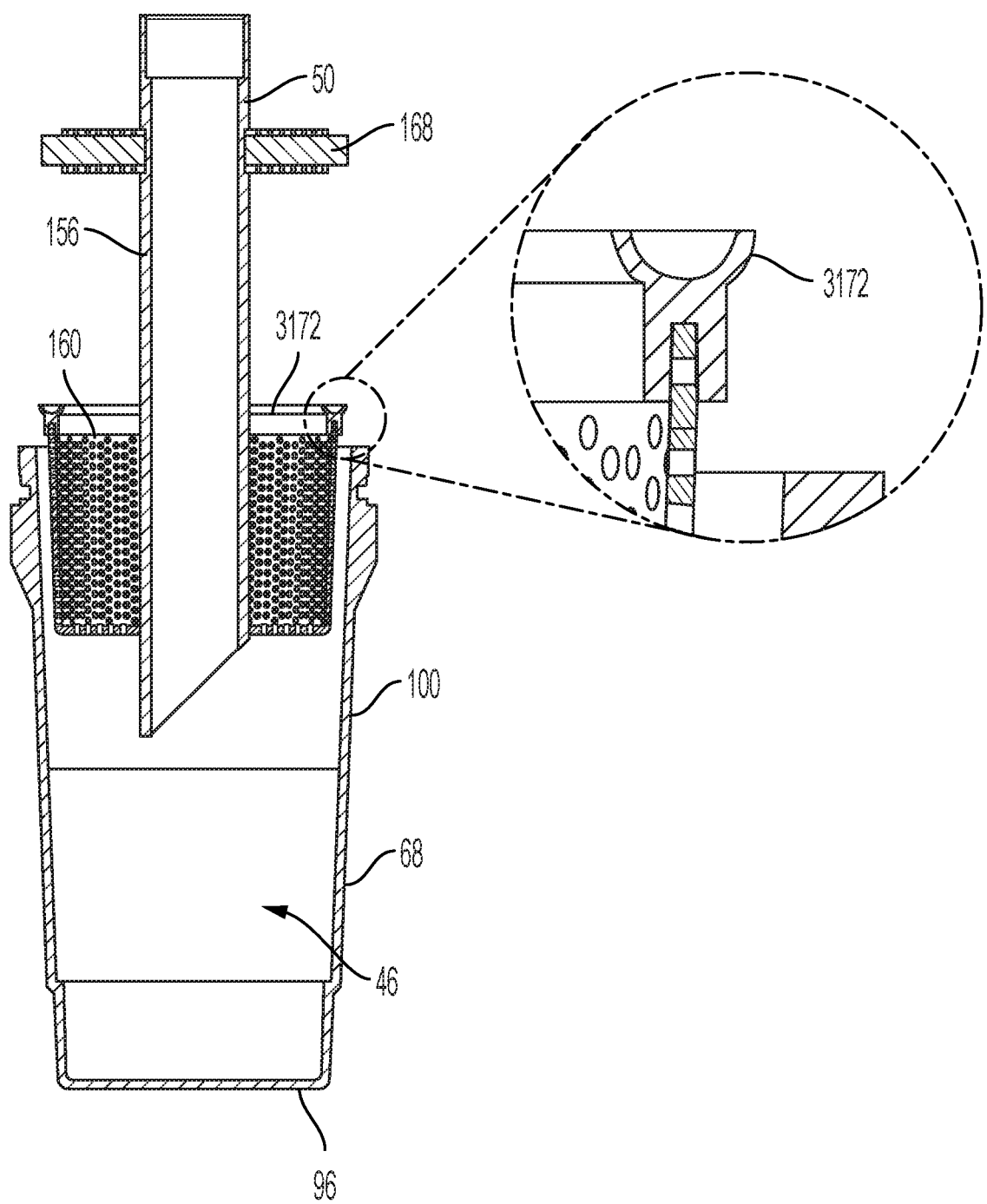
FIGS. 7-8 illustrate the water neutralization system of FIG. 3 with another embodiment of a flange mounted thereon.
Figure 8:
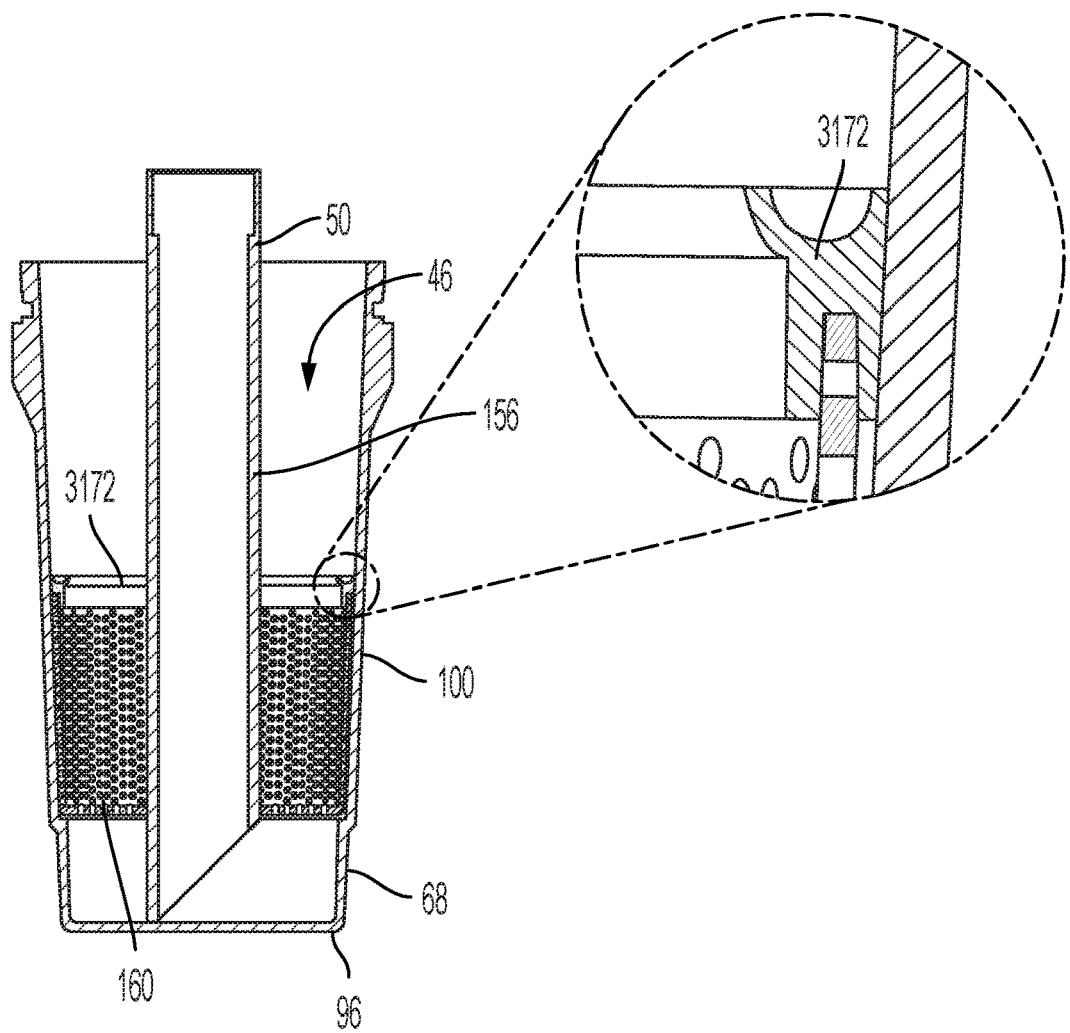
Figure 9:
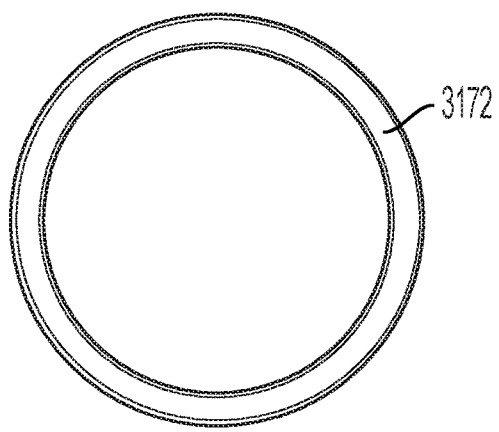
FIG. 9 is a top view of the flange of FIG. 7.
Figure 10:
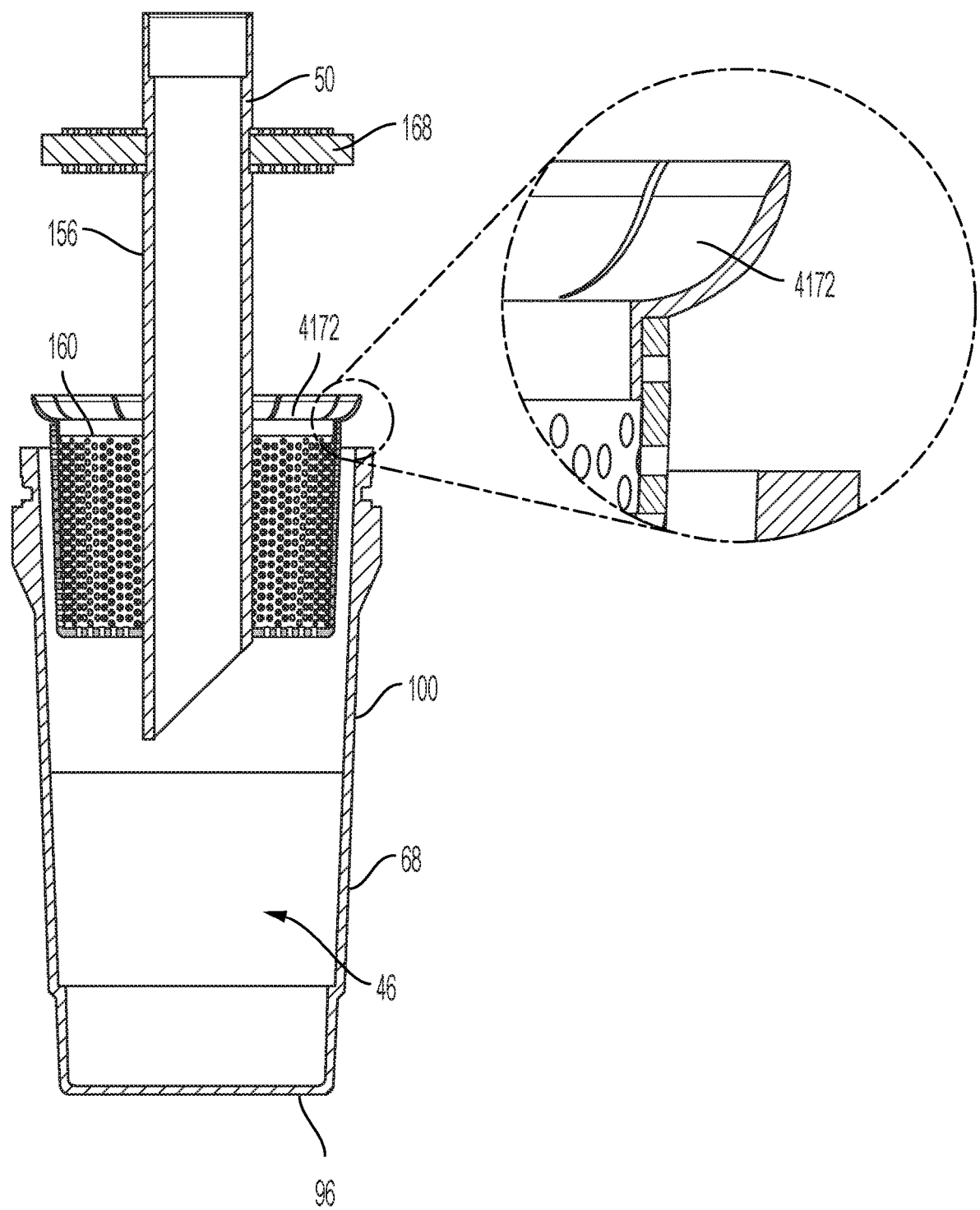
FIGS. 10-11 illustrate the water neutralization system of FIG. 3 with another embodiment of a flange mounted thereon.
Figure 11:
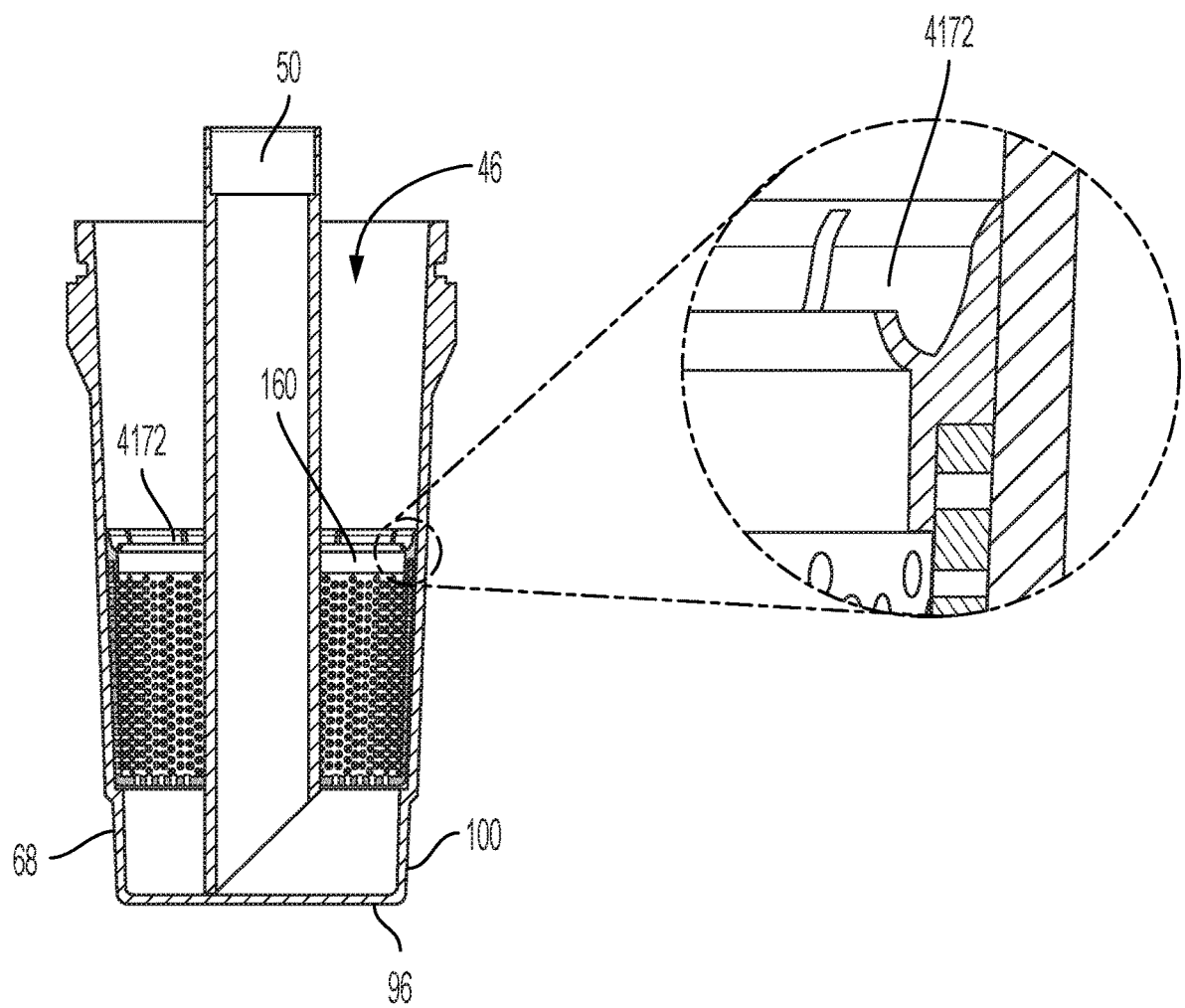
Figure 12:
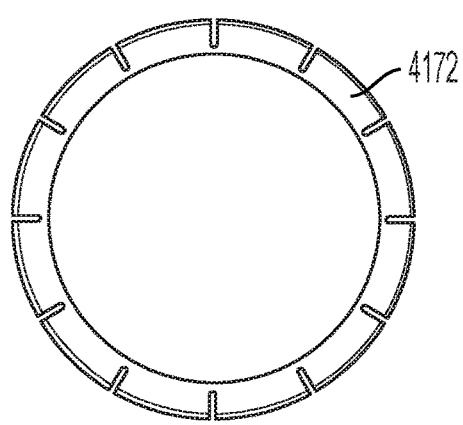
FIG. 12 is a top view of the flange of FIG. 10.
Figure 13:
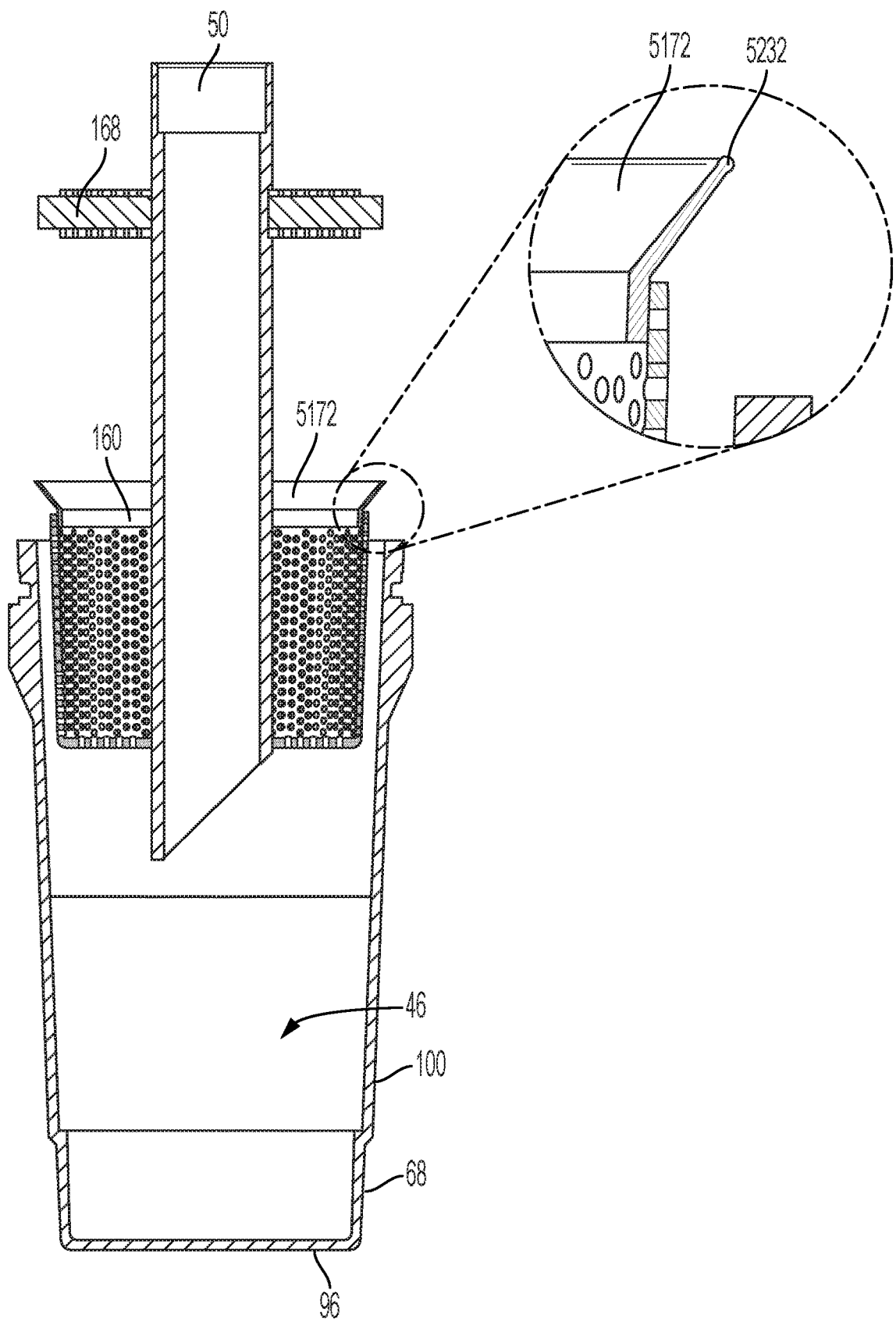
FIGS. 13-14 illustrates the water neutralization system of FIG. 3 with another embodiment of a flange mounted thereon.
Figure 14:
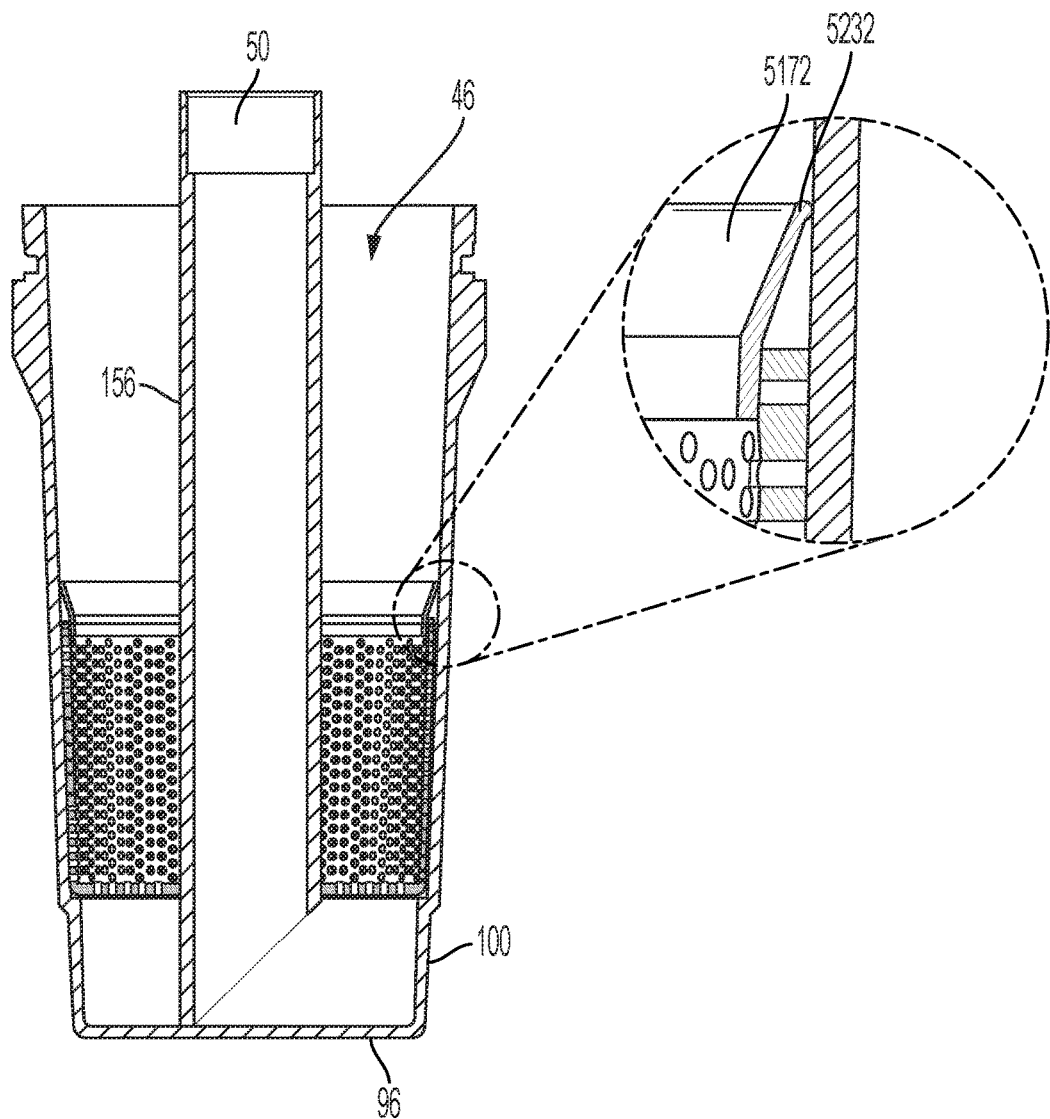
Figure 15:
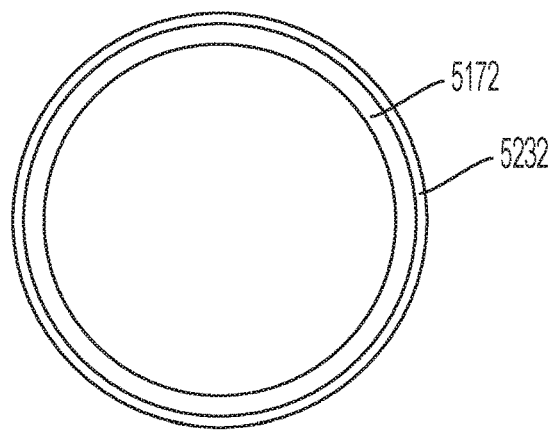
FIG. 15 is a top view of the flange of FIG. 13.

In the illustrated implementation, the flange 172 is mounted to the distal end 200 of the basket 160 and extends radially outwardly and axially away from the base wall 192 (see FIG. 3). The flange 172 is formed as a continuous piece along the entire circumference of the basket 160 (see FIG. 6). However, in alternative implementations, the flange 3172 may have a substantially U-shaped cross-section (see FIGS. 7-9). In still other implementations, the flange 4172 may be sub-divided into two or more arcuate pieces spaced along the circumference of the distal end 200 (see FIGS. 10-12). In still other implementations, the flange 5172 may include a bulb or expansion 5232 on the end thereof (see FIG. 13-15). In such implementations, the bulb 5232 may be substantially circular in cross-sectional shape.

Although the illustrated water neutralization system 26 is installed within the water system 10 such that fluid enters through the first channel 124 and exits via the second channel 138, it is to be understood that in alternative implementations, that the flow may be reversed (e.g., the first channel 124 is the outlet 58 and the second channel 138 is the inlet 54). Furthermore, while the housing 42 is shown with the axis 72 in a substantially vertical orientation, it is understood that the housing 42 may be installed in alternative orientations relative to vertical (e.g., the axis 72 is oriented substantially at an angle relative to vertical, and the like).

During use of the water neutralization system 26, a flow of untreated fluid ("untreated flow B") enters the inlet 54 (e.g., the first end 136 of the first channel 124) via the drain 34 of a corresponding point-source 22. The untreated flow B then flows through first fluid passageway 132 and feed channel 184 where it is discharged into the interior volume 46 proximate the end wall 96 of the second housing portion 68 via the second end 180 of the core 156 (see FIG. 3).

Upon entering the interior volume 46, the untreated flow B begins flowing from the end wall 96 and toward the second open end 104. As the untreated flow B flows axially toward the second open end 104, the flow B first passes through the perforations 212 of the basket 160 where it enters the media region 224. Upon entering the media region 224, the untreated flow B agitates the neutralization media 38 as it flows between and interacts with the individual granules of the water neutralization media 38 where the fluid is treated and neutralized to become treated flow C.

Treated flow C continues to flow axially toward the second open end 104 where it ultimately exits the media region 224 by flowing through the perforations 228 of the first membrane 168, leaving any granules of neutralization media 38 behind. Finally, the treated flow C exits the interior volume 46 through the outlet 58 where it flows into the water return system 30 to be ultimately deposited in a discharge system 32.

To replace or supplement the neutralization media 38, the user first opens the drain valve 126 allowing any residual fluid to exit the interior volume 46 (see FIG. 2). Once drained, the user then detaches the second housing portion 68 from the first housing portion 62 by unthreading the first locking interface 88 from the second locking interface 92. At the same time, the core 156 detaches from the first channel 124. By doing so, the housing 42 enters the open configuration such that the interior volume 46 is accessible via the second open end 104 (see FIG. 4). To note, with the second housing portion 68 removed, the media region 224 is still completely enclosed within the interior volume 46 such that the media 38 itself remains therein (see FIG. 4).

With the housing 42 open, the user may then remove the insert 50 from the interior volume 46 (see FIG. 5). To do so, the user grasps the core 156 proximate the first end 176 thereof and begins removing the insert 50 via the second open end 104. While doing so, the core 156, basket 160, and membrane 168 all move together as a unit in the first direction A and the flange 172 contacts and moves axially along the interior surface 112. The movement of the flange 172, in turn, causes any media 38 located on or stuck to the interior surface 112 to become dislodged and directed into the storage volume 188 of the basket 160. Accordingly, any media 38 contained within the interior volume 46 will be collected by and retained within the storage volume 188 as the insert 50 is removed from the interior volume 46. Any residual fluid contained within the interior volume 46 passes through the perforations 212 of the basket 160 and is therefore left behind.

With the insert 50 removed the user may access the media 38 contained within the storage volume 188 via the gap 216 between the distal end 200 of the basket 160 and the membrane 168 (see FIG. 5). Depending upon the type of maintenance required, the user may add media 38 into the storage volume 188 to supplement the media 38 contained therein, or dump the media 38 present in the storage volume 188 and replace it with new media 38. With the insert 50 removed, the user also has access to the base wall 192 of the second housing portion 68 which can also be cleaned and any debris removed.

With the media 38 replenished and debris removed, the user then returns the insert 50 to the interior volume 46 by axially introducing it therein via the second open end 104 until the second end 180 of the core 156 is proximate the end wall 96 (see FIGS. 4 and 5).

With the insert 50 in place, the user may then re-attach the second housing portion 68 to the first housing portion 62 by re-threading the first locking interface 88 with the second locking interface 92 placing the housing 42 in the closed configuration. Re-attaching the housing portions 62, 68 also causes the first end 176 of the core 156 to re-couple with the first channel 124 (see FIG. 3).

With the housing portions 62, 68 reattached, the water neutralization system 26 may return to normal operation conditions (described above).

FIGS. 16-19D illustrate another implementation of the water neutralization system 6026. The water neutralization system 6026 is substantially similar to the water neutralization system 26 described above, as such, only the differences will be described herein.

The water neutralization system 6026 includes a multi-piece core 6156 having a first portion 6156a defining the first end 6176 and a second portion 6156b defining the second end 6180. During use, the two portions 6156a, 6156b are removably and sealingingly coupled to one another (see FIGS. 16 and 17). In the illustrated implementation, the joint between the first and second portions 6156a, 6156b is located such that the first membrane 6168 is coupled to the first portion 6156a while the basket 6160 is coupled to the second portion 6156b.

The joint between the two portions 6156a, 6156b is substantially similar in connection style to the joint between the first locking interface 6088 and the second locking interface 6092. As such, the action of detaching the first locking interface 6088 from the second locking interface 6092 also causes the first portion 6156a to become detached from the second portion 6156b. In the illustrated implementation, both the joint between the housing portions 6062, 6068 and the joint between the core portions 6156a, 6156b include threaded quarter-turn fasteners. However, in alterative implementations, different forms of connection may be used.

Although not shown, in still other implementations, the connection style for the two joints may also be different, such that the user can selectively detach the housing portions 6062, 6068 separately from the core portions 6156a, 6156b (not shown).

Figure 16:
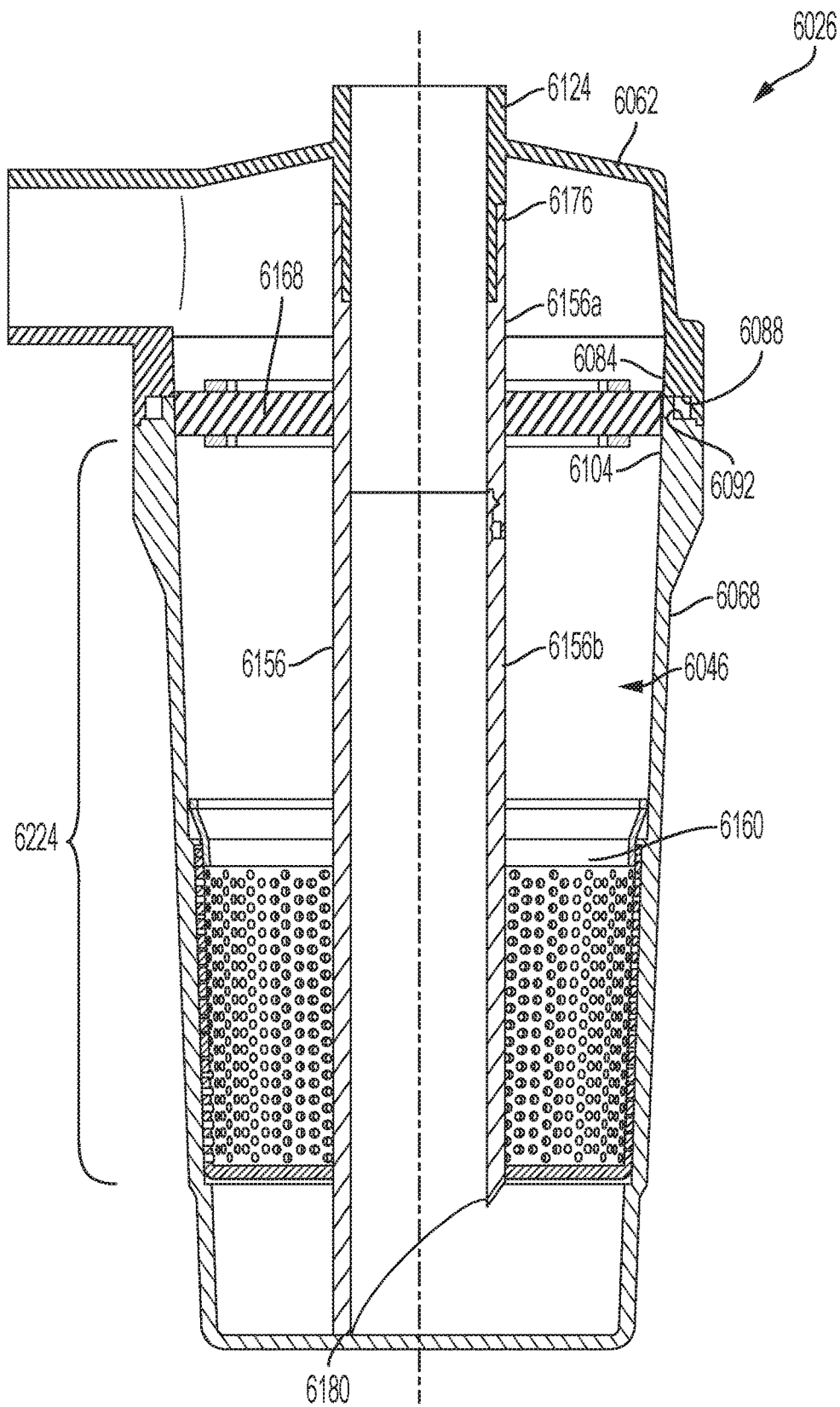
FIG. 16 is a section view of another embodiment of a water neutralization system.

To replace or supplement the neutralization media 38 using the water neutralization system 6026, the user first opens the drain valve (not shown) allowing any residual fluid to exit the interior volume 6046 (see FIG. 16). Once drained, the user then rotates the second housing portion 6068 relative to the first housing portion 6062. This rotation causes both the first locking interface 6088 to detach from the second locking interface 6092 and the first core portion 6156a to detach from the second core portion 6156b as described above. The user may then remove the second housing portion 6068 from the first housing portion 6062.

When removing the second housing portion 6068, the first core portion 6156a remains attached to the first housing portion 6062. As such, the first membrane 6168 remains attached to the first core portion 6156a and is therefore removed from the interior volume 6046 (see FIG. 17). This results in the media region 6224 being opened and accessible via the second open end 6104. If needed, the user may then further remove the second core portion 6156b from the interior volume 6046 as described above.

Figure 18:
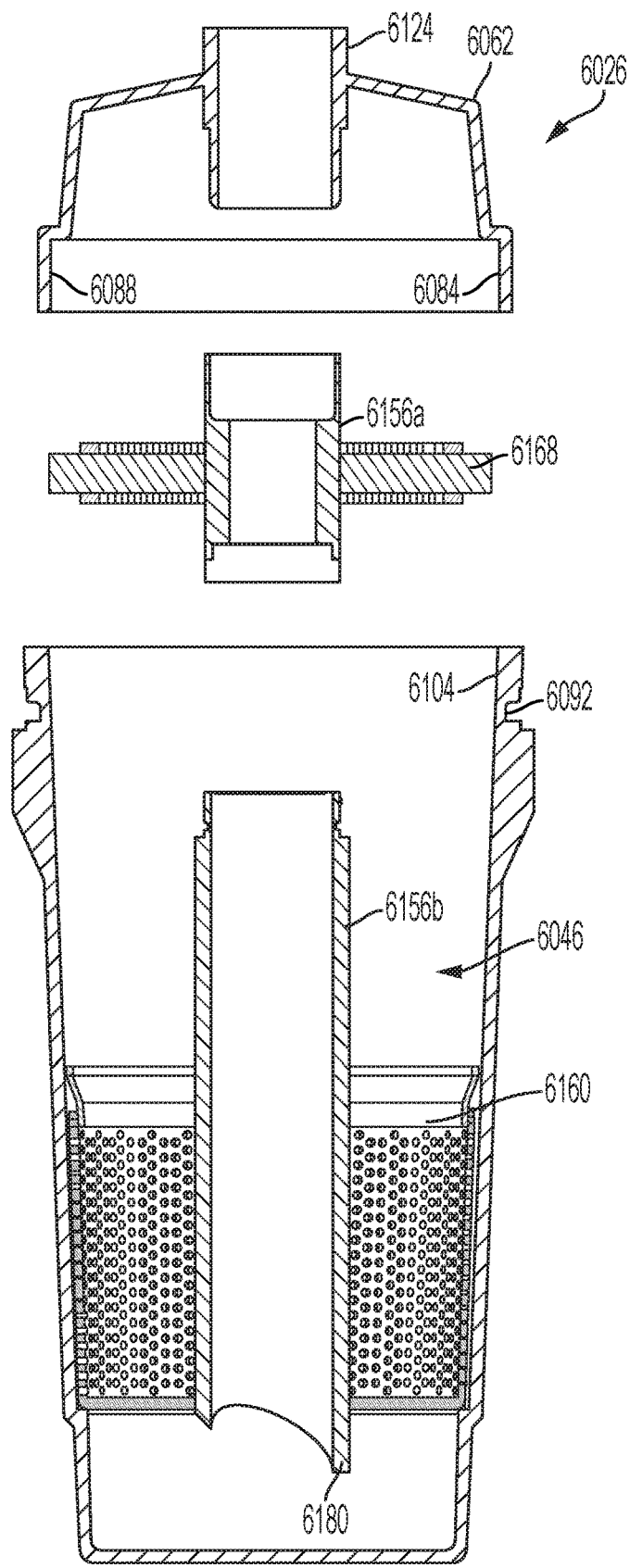
FIG. 18 illustrates the water neutralization system of FIG. 17 with the upper core portion removed from the first housing portion.
Figure 19C:
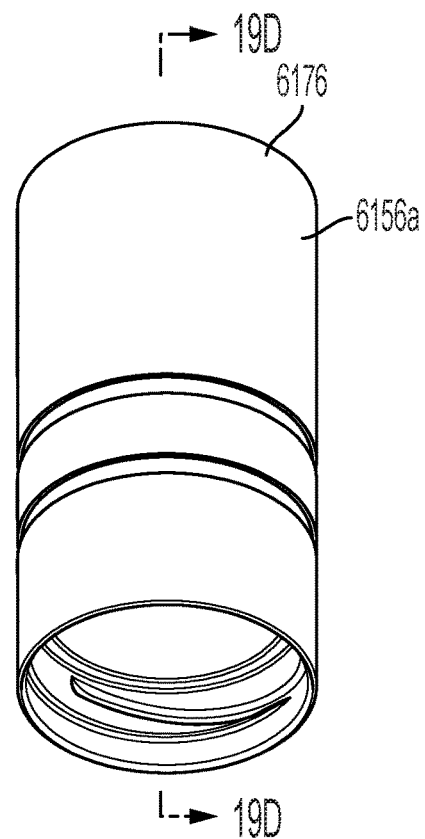
Figure 19D:
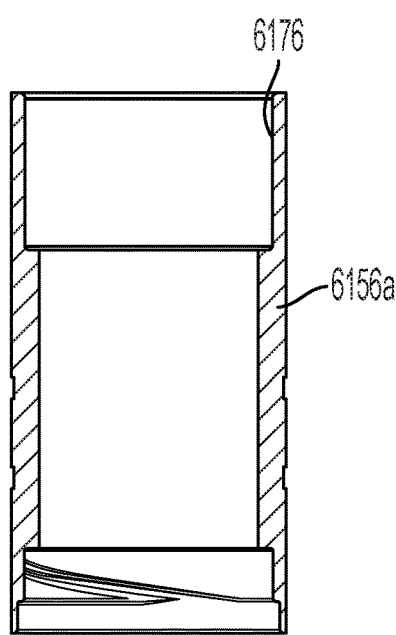

In instances where the first membrane 6168 also needs cleaning, the user may subsequently detach the first core portion 6156a from the first channel 6124 (see FIG. 18).

Figure 17:
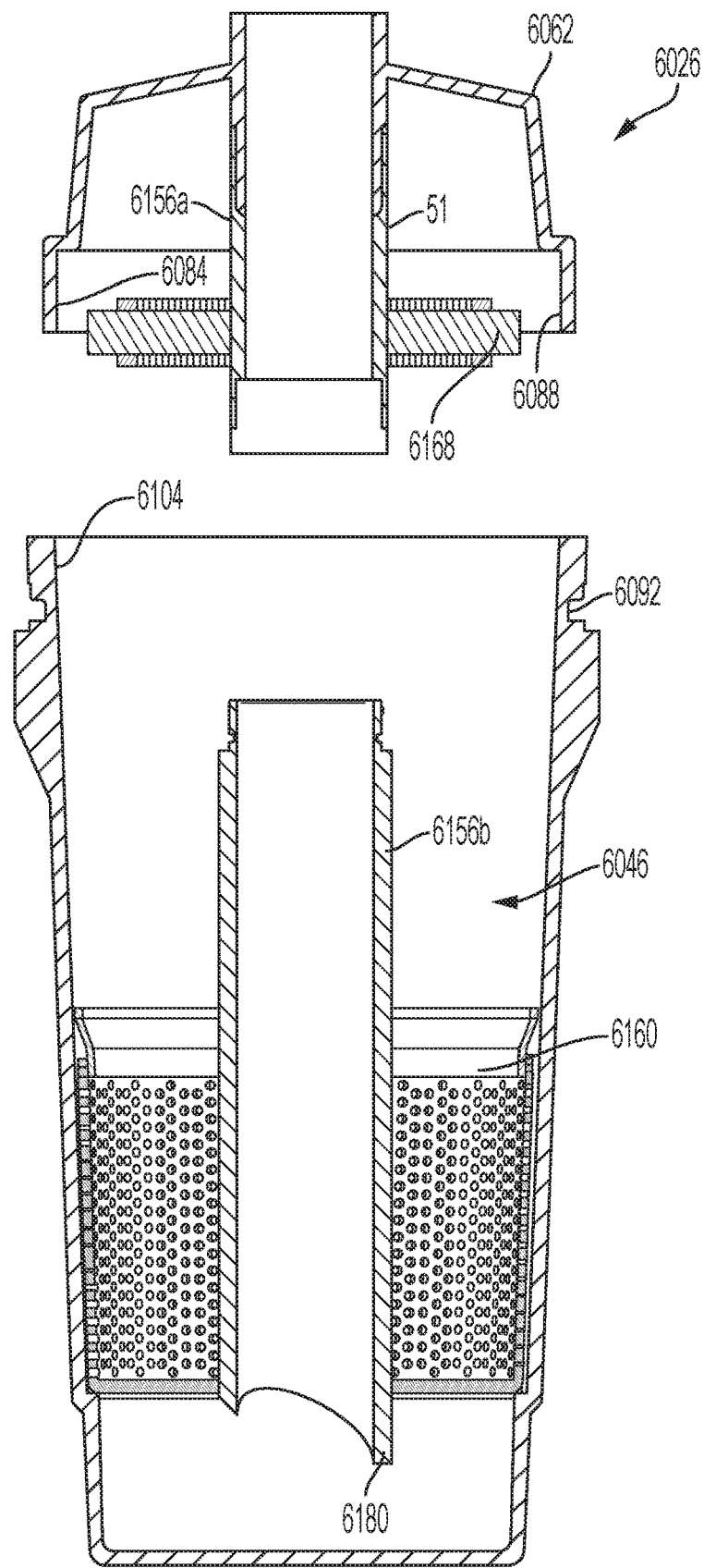
FIG. 17 illustrates the water neutralization system of FIG. 16 with the first housing portion removed from the second housing portion.

After the media 38 has been supplemented or replaced, the user may then re-assemble the water neutralization system 6026 by re-attaching the first core portion 6156a to the first channel 6124 (see FIG. 17). With the first core portion 6156a attached, the user may then re-connect the second housing portion 6068 to the first housing portion 6062 by rotating the second housing portion 6068 relative to the first housing portion 6062. As described above, rotation of the housing portions 6062, 6068 relative to one another also causes the two core portions 6156a, 6156b to also re-connect (see FIG. 16). Once the housings 6062, 6068 and core portions 6156a, 6156b are re-connected, regular water neutralization processes may resume FIGS. 24-28B illustrate another implementation of the water neutralization system 7026. The water neutralization system 7026 is substantially similar to the water neutralization system 26 described above, as such, only the differences will be described herein.

The water neutralization system 7026 includes a second membrane 7500 positioned at least partially within the interior volume 7046 upstream of the first membrane 7168 and downstream of the inlet 7054. The second membrane 7500 is substantially disk shaped having an interior opening 7524 configured to be at least partially received within a corresponding groove 7504 of the core 7156. The second membrane 7500 also includes an outer diameter 7508 that substantially corresponds with the interior surface 7112 of the housing 7042. More specifically, when the second membrane 7500 is positioned within the interior volume 7046 for use, the membrane 7500 also rests against and is at least partially supported by a corresponding ledge 7512 of the interior surface 7112 of the housing 7042.

The second membrane 7500 also includes a plurality of apertures 7518 formed therein to selectively allow fluid to flow therethrough while restricting the flow of media 38 therethrough. More specifically, the second membrane 7500 is sub-divided into a plurality of regions 7516 each separated by a radially extending slot 7520. Each slot 7520, in turn, is open to the interior opening 7524 and extends radially outwardly where it terminates proximate the outer diameter 7508 with an enlarged region 7528.

Within each region 7516, the second membrane 7500 includes a plurality of apertures 7518 evenly spaced from one another and sized to restrict the flow of the media 38 therethrough. More specifically, each aperture includes a diameter of approximately 0.12 inches in diameter and is spaced approximately 0.2 inches apart from all immediately adjacent apertures 7518. Each aperture is also beveled to both the upstream and downstream side (See FIG. 28B).

When assembled, the first or downstream membrane 7168 has a first effective particle size and the second or upstream membrane 7500 has a second effective particle size that is different than the first effective particle size. More specifically, the first effective particle size is smaller than the second effective particle size. The two membranes 7500, 7168 are also different styles with the second membrane 7500 being a series of macro apertures while the first membrane 7168 being formed from layers of air filter paper.

For reasons of completeness, various aspects of the invention are set out in the following numbered clauses:

Clause 1. A wastewater neutralization system for use with a point-source device, the wastewater neutralization system comprising:
 a housing;
 an interior volume at least partially defined by the housing, wherein the interior volume includes an inlet in fluid communication with the point-source device and an outlet;
 wastewater neutralization media positioned within the interior volume;
 a basket removably located within the interior volume of the body between the inlet and the outlet, wherein the basket includes one or more perforations formed therein that are sized such that a majority of the wastewater neutralization media cannot pass therethrough, and wherein removing the basket from the interior volume causes the basket to collect and remove the wastewater neutralization media from the interior volume.

Clause 2. The wastewater neutralization system of claim 1, wherein the basket is substantially cylindrical in shape having a bottom wall and a side wall extending from the bottom wall to produce a distal end.

Clause 3. The wastewater neutralization system of claim 1, wherein the volume is at least partially defined by an interior wall, and wherein the basket includes a flange extending therefrom configured to engage the interior wall.

Clause 4. The wastewater neutralization system of claim 3, wherein the flange is configured to slide along the interior wall as the basket is removed from the volume.

Clause 5. The wastewater neutralization system of claim 3, wherein the flange is flexible.

Clause 6. The wastewater neutralization system of claim 1, wherein removing the basket from the volume removes the wastewater neutralization media from the volume but allows at least a portion of any fluid contained within the volume to remain therein.

Clause 7. The wastewater neutralization system of claim 1, further comprising a membrane at least partially positioned within the interior volume and spaced a distance from the basket, wherein the membrane includes one or more perforations sized such that the wastewater neutralization media cannot pass therethrough.

Clause 8. The wastewater neutralization system of claim 7, wherein the basket and the membrane at least partially define a media region therebetween, and wherein the water neutralization media is positioned within the media region.

Clause 9. The wastewater neutralization system of claim 7, wherein the membrane and the basket move together as a unit.

Clause 10. The wastewater neutralization system of claim 9, wherein the membrane is spaced a distance from the basket to form a gap therebetween.

Clause 11. The wastewater neutralization system of claim 1, wherein the point-source device includes a sink.

Clause 12. The wastewater neutralization system of claim 1, wherein the wastewater neutralization media is buoyant.

Clause 13. A wastewater neutralization system for use with a point-source device and wastewater neutralization media, the wastewater neutralization system comprising:
 a housing having an interior surface that at least partially defines an interior volume;
 a basket at least partially positioned within the interior volume and removable therefrom, wherein the basket includes one or more apertures formed therein, and wherein the apertures are sized such that a majority of the wastewater neutralization media cannot pass therethrough;
 a flange coupled to the basket and configured to contact the interior surface, wherein the flange is formed from flexible material.

Clause 14. The wastewater neutralization system of claim 13, wherein the flange is configured to slide along the interior surface as the insert assembly is removed from the volume.

Clause 15. The wastewater neutralization system of claim 13, wherein volume is substantially cylindrical in shape and includes an open end, and wherein the insert slides axially into and out of the interior volume via the open end.

Clause 16. The wastewater neutralization system of claim 13, further comprising a membrane coupled to the basket and movable together therewith, wherein the membrane includes a plurality of apertures sized such that the media cannot pass therethrough.

Clause 17. The wastewater neutralization system of claim 16, wherein the membrane is spaced a distance from the basket to form a gap therebetween.

Clause 18. A wastewater neutralization system for use with a point-source device, the wastewater neutralization system comprising:
- a housing having an interior surface at least partially defining an interior volume therein, wherein the housing has a first open end;
- an insert at least partially positioned within the interior volume and removable therefrom via the open end, the insert including:
  - a core;
  - a first membrane coupled to the core, wherein the first membrane includes one or more perforations, and
  - a second membrane coupled to the core and spaced a distance from the first membrane, wherein the second membrane includes one or more perforations; and
- wastewater neutralization media positioned within the volume and located between the first membrane and the second membrane, wherein the wastewater neutralization media is sized such that it cannot pass through the one or more perforations of the first membrane or the one or more perforations of the second membrane.

Clause 19. The wastewater neutralization system of claim 18, wherein the insert includes a flange configured to engage and travel along the interior surface.

Clause 20. The wastewater neutralization system of claim 18, wherein at least one of the first membrane and the second membrane form a basket that is concave in shape.

Clause 21. A wastewater neutralization system for use with a point-source device and wastewater neutralization media, the wastewater neutralization system comprising:
- a housing having an interior surface at least partially defining an interior volume therein, wherein the housing has a first open end, and wherein the housing includes an inlet and an outlet; and
- an insert at least partially positioned within the interior volume and removable therefrom via the open end, wherein the insert is positioned downstream of the inlet and upstream of the outlet, the insert including:
  - a membrane, wherein the first membrane includes one or more perforations sized such that the wastewater neutralization media cannot pass therethrough, and
  - a basket fixed spatially relative to the membrane and spaced a distance therefrom, wherein the basket includes one or more perforations formed therein sized such that the wastewater neutralization media cannot pass therethrough.

Clause 22. The wastewater neutralization system of claim 21, wherein the basket is positioned upstream of the membrane.

Clause 23. The wastewater neutralization system of claim 21, wherein the basket is concave in shape.

Clause 24. A wastewater neutralization system for use with a point-source device, the wastewater neutralization system comprising:
- a housing having an interior surface at least partially defining an interior volume therein;
- an inlet in fluid communication with the point-source device and open to the interior volume;
- an outlet open to the interior volume;
- wastewater neutralization media positioned within the interior volume;
- a basket removably located within the interior volume of the body between the inlet and the outlet, wherein the basket includes one or more perforations formed therein that are sized such that the wastewater neutralization media cannot pass therethrough; and
- a flange coupled to and extending outwardly from the basket, wherein the flange is configured to engage the interior surface of the housing.

Clause 25. The wastewater neutralization system of claim 24, wherein the basket includes a base wall and a side wall extending from the base wall to produce a distal end.

Clause 26. The wastewater neutralization system of claim 25, wherein the flange extending along the entire circumference of the distal end.

Clause 27. The wastewater neutralization system of claim 25, wherein the flange is coupled to the basket at the distal end.

Clause 28. A wastewater neutralization system for use with a point-source device, the wastewater neutralization system comprising:
- a first housing portion, wherein the first housing portion includes an inlet and an outlet;
- a second housing portion removably coupled to the first housing portion to define an interior volume therebetween;
- a first core portion coupled to the first housing portion and in fluid communication with inlet;
- a second core portion removably coupled to the first core portion, wherein the first core portion and the second core portion produce a channel when coupled together;
- a membrane coupled to first core portion, wherein the first membrane includes one or more perforations, and
- a basket coupled to the second core portion, wherein the basket includes one or more perforations; and
- wastewater neutralization media positioned within the volume and located between the membrane and the basket, wherein the wastewater neutralization media is sized such that it cannot pass through the one or more perforations of the membrane or the one or more perforations of the basket.

Clause 29. A method of replacing wastewater neutralization media from a wastewater neutralization system having a housing at least partially defining an interior volume therein with an inlet and an outlet, a basket at least partially positioned within the interior volume, wherein the basket defines one or more apertures sized such that the wastewater neutralization media cannot pass therethrough, the method comprising:
- adjusting the housing from a closed configuration, in which the interior volume is not accessible from an exterior of the housing, to an open configuration, in which the interior volume is accessible from the exterior of the housing; and
- removing the basket from the interior volume such that the basket collects and retains any wastewater neutralization media contained within the interior volume;
- replacing or supplementing the wastewater neutralization media; and
- returning the basket to the interior volume.

Clause 30. The method of claim 29, further comprising removing a membrane from the interior volume, wherein the membrane includes one or more perforations sized such that the wastewater neutralization media cannot pass therethrough.

Clause 31. The method of claim 29, wherein removing the basket from the interior volume allows any fluids contained within the interior volume to remain therein.

Clause 32. A wastewater neutralization system for use with a point-source device, the wastewater neutralization system comprising:

a housing having an interior surface at least partially defining an interior volume therein, wherein the housing has a first open end;

an insert at least partially positioned within the interior volume and removable therefrom via the open end, the insert including:

a core;

a first membrane coupled to the core, wherein the first membrane includes a first effective particle size, and a second membrane coupled to the core, wherein the second membrane includes a second effective particle size different than the first effective particle size.

It is understood that the foregoing detailed description is merely illustrative and is not to be taken as limitations upon the scope of the invention, which is defined solely by the appended claims and their equivalents.

Various changes and modifications to the disclosed embodiments will be apparent to those skilled in the art. Various features and advantages of the invention are set forth in the following claims.

What is claimed is:

1. A wastewater neutralization system for use with a point-source device, the wastewater neutralization system comprising:

a housing;

an interior volume at least partially defined by the housing, wherein the interior volume includes an inlet in fluid communication with the point-source device and an outlet;

wastewater neutralization media positioned within the interior volume;

a membrane at least partially positioned within the interior volume; and a basket removably located within the interior volume of the housing between the inlet and the outlet, the basket defining an open end, and wherein the open end is spaced a distance from the membrane so that the open end is accessible therebetween, wherein the basket includes one or more perforations formed therein that are sized such that a majority of the wastewater neutralization media cannot pass therethrough, wherein removing the basket from the interior volume causes the basket to collect and remove the wastewater neutralization media from the interior volume, and wherein the membrane and the basket move together as a unit.

2. The wastewater neutralization system of claim 1, wherein the basket is cylindrical in shape having a bottom wall and a side wall extending from the bottom wall to define the open end.

3. The wastewater neutralization system of claim 1, wherein the interior volume is at least partially defined by an interior wall, and wherein the basket includes a flange extending therefrom configured to engage the interior wall.

4. The wastewater neutralization system of claim 3, wherein the flange is configured to slide along the interior wall as the basket is removed from the volume.

5. The wastewater neutralization system of claim 3, wherein the flange is flexible.

6. The wastewater neutralization system of claim 1, wherein removing the basket from the interior volume removes the wastewater neutralization media from the interior volume but allows at least a portion of any fluid contained within the volume to remain therein.

7. The wastewater neutralization system of claim 1, wherein the membrane includes one or more perforations sized such that the wastewater neutralization media cannot pass therethrough.

8. The wastewater neutralization system of claim 7, wherein the basket and the membrane at least partially define a media region therebetween, and wherein the water neutralization media is positioned within the media region.

9. The wastewater neutralization system of claim 1, wherein the point-source device includes a sink.

10. The wastewater neutralization system of claim 1, wherein the wastewater neutralization media is buoyant.

11. The wastewater neutralization system of claim 1, further comprising a core extending between and coupled to both the membrane and the basket.

12. A wastewater neutralization system for use with a point-source device and wastewater neutralization media, the wastewater neutralization system comprising:

a housing having an interior surface that at least partially defines an interior volume;

a basket at least partially positioned within the interior volume and removable therefrom, wherein the basket includes one or more apertures formed therein, and wherein the apertures are sized such that a majority of the wastewater neutralization media cannot pass therethrough; and a flange coupled to the basket and configured to contact the interior surface and direct the wastewater neutralization media into the basket as the flange slides along the interior surface when removing the basket from the interior surface, wherein the flange is formed from flexible material.

13. The wastewater neutralization system of claim 12, wherein the interior volume is cylindrical in shape and includes an open end, and wherein the insert slides axially into and out of the interior volume via the open end.

14. The wastewater neutralization system of claim 12, further comprising a membrane coupled to the basket and movable together therewith, wherein the membrane includes a plurality of apertures sized such that the media cannot pass therethrough.

15. The wastewater neutralization system of claim 14, wherein the membrane is spaced a distance from the basket to form a gap therebetween.

16. A wastewater neutralization system for use with a point-source device, the wastewater neutralization system comprising:

a housing, the housing having an interior surface at least partially defining an interior volume therein, wherein the housing has defines a first open end;

an insert at least partially positioned within the interior volume and removable therefrom via the first open end, the insert including:

a core;

a first membrane coupled to the core, wherein the first membrane includes one or more perforations, and a second membrane coupled to the core and spaced a distance from the first membrane to at least partially define an insert volume therebetween, wherein the second membrane includes one or more perforations; and wastewater neutralization media positioned within the insert volume, wherein the wastewater neutralization media is sized such that it cannot pass through the one or more perforations of the first membrane or the one or more perforations of the second membrane, and wherein the insert is movable between a first position, in which the insert is at least partially positioned within the interior volume and the insert volume is at least partially defined by the interior surface such that the wastewater neutralization media is retained within the insert volume, and a second position, in which the insert is positioned outside the interior volume and the insert volume is accessible.

17. The wastewater neutralization system of claim 16, wherein the insert includes a flange configured to engage and travel along the interior surface.

18. The wastewater neutralization system of claim 16, wherein at least one of the first membrane and the second membrane form a basket that is concave in shape.

\* \* \* \* \*